(12) United States Patent
Hibi

(10) Patent No.: US 6,937,288 B2
(45) Date of Patent: Aug. 30, 2005

(54) BEAM CURRENT LIMITING CIRCUIT FOR USE IN A VIDEO PROJECTOR

(75) Inventor: Taketoshi Hibi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 701 days.

(21) Appl. No.: 09/837,386

(22) Filed: Apr. 19, 2001

(65) Prior Publication Data

US 2002/0001040 A1 Jan. 3, 2002

(30) Foreign Application Priority Data

May 18, 2000 (JP) .................................... P.2000-145996

(51) Int. Cl.[7] .......................... H04W 5/68; H04W 9/22
(52) U.S. Cl. .................. 348/380; 348/379; 348/377; 315/381
(58) Field of Search ............................. 348/380, 379, 348/377, 173, 687, 690, 692, 697, 776, 778; 315/381, 386, 382.1, 383; 715/867

(56) References Cited

U.S. PATENT DOCUMENTS

| | | | | |
|---|---|---|---|---|
| 3,873,767 A | * | 3/1975 | Okada et al. | 348/673 |
| 4,298,885 A | * | 11/1981 | Okada | 348/679 |
| 4,387,390 A | * | 6/1983 | Reneau et al. | 348/380 |
| 4,703,345 A | * | 10/1987 | Matsuzaki et al. | 348/657 |
| 5,589,883 A | * | 12/1996 | Ogino et al. | 348/379 |
| 5,592,238 A | * | 1/1997 | Ogino et al. | 348/744 |
| 5,889,557 A | * | 3/1999 | Sato | 348/380 |
| 6,285,401 B1 | * | 9/2001 | Griepentrog | 348/380 |
| 6,493,040 B1 | * | 12/2002 | Miller | 348/62 |

FOREIGN PATENT DOCUMENTS

| | | |
|---|---|---|
| CN | 1007401 B | 3/1990 |
| CN | 1093848 A | 10/1994 |
| CN | 1195946 A | 10/1998 |
| JP | 63208376 | 8/1988 |
| JP | 5276461 | 10/1998 |
| JP | 1132235 | 2/1999 |

* cited by examiner

Primary Examiner—John Miller
Assistant Examiner—Jean W. Désir
(74) Attorney, Agent, or Firm—Birch, Stewart, Kolasch & Birch, LLP.

(57) ABSTRACT

In a beam current limiting circuit for a video projector, an average current is limited under closed loop control containing an anode current detection circuit 5. On the other hand, a cathode current detection circuit 107 comprises a first resistor and a second resistor in series to a cathode current circuit and detects a cutoff current at the voltage across the first resistor and an average current at the voltage across the second resistor. An offset addition circuit 11 is provided for correcting the detection value of the average current based on the maximum value of detected cathode current, and beam current is limited. Further, means 15 for detecting time change of anode current is provided and if the current value does not change for a long time, the beam current is limited to a smaller value.

5 Claims, 17 Drawing Sheets

BEAM CURRENT LIMITING CIRCUIT FOR USE IN A VIDEO PROJECTOR

BACKGROUND OF THE INVENTION

1. Field of the Invention

This invention relates to a beam current limiting circuit for use in a CRT-type video projector.

2. Description of the Related Art

FIG. 11 shows a CRT beam current limiting circuit in a related art. In FIG. 11, SIG1 denotes a television signal, numeral 1 denotes a signal processing circuit, numeral 2 denotes an amplification circuit, 3R, 3G, and 3B denote CRTs for producing red display, green display, and blue display respectively, numeral 4 denotes a flyback transformer, numeral 5 denotes a current detection circuit, and numeral 6 denotes a comparison circuit for comparing a detected current with a reference value. The signal processing circuit 1 and the comparison circuit 6 are may be integrated as an integrated circuit IC1, but the operation is the same regardless of whether they are integrated or separate.

The operation is as follows: The television signal SIG1 is input to the signal processing circuit 1, which then makes image quality corrections to color, contrast, brightness, etc., and outputs a red signal R, a green signal G, and a blue signal B to the amplification circuit 2. The amplification circuit 2 amplifies the signal amplitude until each input signal becomes a voltage sufficient for driving the cathode of the corresponding CRT. For example, the amplified red signal is input to the cathode of the red CRT 3R. Consequently, a current IKR flows into the cathode. Likewise, a current IKG flows into the cathode of the green CRT 3G and a current IKB flows into the cathode of the blue CRT 3B.

The anode current of each CRT is introduced into the flyback transformer 4 and total anode current IA of the three CRTs flows into the primary terminal of the flyback transformer 4. The anode current IA is introduced into the current detection circuit 5 and is sent through a resistor R1 to a power supply VCC1. A beam current is detected as a potential drop across terminals of the detection resistor R1 based on the current IA and the current detection circuit 5 outputs a detected voltage VDET1 to the voltage comparison circuit 6, which then compares the VDET1 with a predetermined value. If the VDET1 is lower than the predetermined value, the voltage comparison circuit 6 sends an excessive current detection signal CONT6 to the signal processing circuit 1, which then changes the contrast and (or) brightness of the television signal, thereby lessening the average level of output R, G, and B signals. Consequently, the average level of the cathode currents IKR, IKG, and IKB is lessened and the anode current IA is limited.

If a CRT used with a video projector has a screen width across corner of 7 inches, a cathode current can be allowed to flow with up to an average value of about 600 µA or an instantaneous value of about 6000 µAp-p for use as the part alone. When the average value of the beam current for driving a CRT becomes excessive, the phosphor temperature rises, the light emission intensity lowers, and a CRT face plate is placed at a high temperature and is broken; this is a problem. For a power supply circuit for supplying a CRT anode current, if the current becomes excessive, each part circuit voltage fluctuates, distortion occurs on a television display screen, and the parts of the power supply circuit are broken due to overload; this is a problem. To prevent the problems from occurring, the CRT anode current is detected and is limited so that the current value becomes a predetermined value or less.

FIG. 12 shows the relationship between image signal input level and CRT anode current, and change in the input signal level with time. In the figure, a curve I1 is a line indicating the relationship between input signal level SPEAK and average anode current IA, a curve V1 is a line indicating a change in the input signal level with time, T1 denotes a horizontal blank period, T2 denotes a video period, S denotes the average level of video signal, and SPEAK denotes the maximum level of video. Even if SPEAK is constant, the average signal level fluctuates and thus S also fluctuates. Therefore, I1 is shown for a normal level image.

A point I1A on the curve I1 is a point indicating a current corresponding to a detected current level when current in a black image (cutoff current) is automatically adjusted in a configuration having an AKB (automatic kinescope bias) circuit not shown in the example, a point I1B is a point indicating a current when the maximum level of a standard signal is input, a point I1C is a point indicating a current level of the result of executing current limiting when a signal at a level larger than the standard level is input, and a point I1D is a point indicating a flowing current level if current limiting is not executed.

When a normal image signal is input, V1 is a waveform having asperities finely fluctuating in response to the image as shown in FIG. 12 and even if SPEAK is large, the average level S is smaller than it. Anode current has a characteristic of nonlinearly increasing in response to the signal level as shown by the curve I1; particularly if the input level is large, the anode current change ratio is large.

Current limiting is executed, whereby the current when a signal at a level larger than the standard signal is input is limited from the level of I1D to the level of I1C. As a result, as described above, the anode current as the total of three CRTs is limited to I1LIMIT.

FIG. 13 shows the relationship between signal level and anode current when a uniform plane image signal is input, and change in the input signal level with time. In the figure, a curve I2 is a line indicating the relationship between input signal level SPEAK and average anode current IA, a curve V2 is a line indicating a change in the input signal level with time. The average signal level of the plane image is high as indicated by V2 and thus the level of S increases near to SPEAK. Therefore, as compared with I1 in FIG. 12 when the normal average level image is input, the value of I2 is large even at the same input signal peak level, and thus reaches a current limit value I2LIMIT even if the input level is less than the standard signal level, as indicated by the point I2B in FIG. 13. I2LIMIT and the current level indicated by the point I2A in FIG. 13 correspond to and are the same values as I1LIMIT and the current level indicated by the point I1A in FIG. 12.

FIG. 14 is a three-axis graph to show the range in which the cathode currents of the three CRTs are limited. The axes represent the cathode currents IKR, IKG, and IKB. The plane having a triangle TRI1 touching the three axes as an outer periphery indicates the range in which the total of IKR, IKG, and IKB limited as the result of limiting the anode currents to I1LIMIT becomes the constant value I1LIMIT, and the triangular pyramid surrounded by the triangle and an origin O represents the range in which the three cathode currents can be changed.

A point P1 in the vicinity of the center of the triangle TRI1 is a point representing a current after current limiting circuit operates when a white plane signal or a normal image is input at a large level. IKR, IKG, and IKB corresponding to the point P1 take each roughly the value of a third of I1LIMIT. I1LIMIT is set to a value a little smaller than three times the rated average current value of a sole CRT beam. Consequently, the normal television signal or white plane signal is limited so that the beam current does not exceed the rated average current of each CRT, and an excessive load exceeding I1LIMIT can also be prevented on the power supply circuit connected to the anode of the CRT.

In FIG. 14, a point P2 on the IKB axis represents a current when a blue plane signal is input, for example. IKB reaches I1LIMIT because current flows into only the beam of the blue CRT although it is within the current limit range. As mentioned above, the rated current of IKB is roughly a third of I1LIMIT and thus in the example, a beam current about three times the rated value flows into the blue CRT. In a general image, the occurrence frequency of the blue plane signal is low. However, some machines such as videocassette recorders output a blue plane signal when the end of image reproduced on tape is reached and if such a machine is connected, a blue signal may be input consecutively. In this case, a rated or more beam current flows into the blue CRT for a long time. The occurrence frequency of a colored plane signal is low if the signal is limited to a television signal, but the occurrence frequency is considerably high if a menu screen and a computer-generated signal are contained in addition to the blue signal as a mute signal.

FIG. 15 shows the measurement result of the relationship between light emission intensity and light emission time of CRT when the CRT is driven with a beam current at a level close to the rated current. The light emission intensity is lowered with time and is lowered 10% or more after the expiration of 1000 hours. For example, if video projector is connected to a computer all the time, when the computer screen is a pale blue background, if it is input, the beam current of the blue CRT mainly flows, but the color is pale and thus the beam current is also distributed to IKR and IKG and the value of IKB does not reach I1LIMIT. In the example, the value of IKB becomes about a third of I1LIMIT, and under the condition that it is in the vicinity of the rated current of the CRT, lowering of the intensity of the blue CRT can be estimated as follows: If a computer is connected to the projector for four hours a day and the projector to which the computer is connected is operated for 300 days a year, the sum total of the CRT light emission time becomes 4×300 =1200 hours. From the result shown in FIG. 15, the light emission intensity of the blue CRT is lowered 10% or more as compared with the initial light emission intensity. Consequently, to display a white plane, blue is insufficient and the white plane is not displayed in the original color.

FIG. 16 shows a CRT beam current limiting circuit in a second related art. Components identical with those previously described with reference to FIG. 11 are denoted by the same reference numerals in FIG. 16. Numeral 7 denotes a current detection circuit for detecting cathode currents of CRTs, numeral 8 denotes a maximum value selection circuit for inputting a detected current, and numeral 9 denotes a maximum value selection circuit for inputting a plurality of detected currents. The operation of the components different from those previously described with reference to FIG. 11 will be discussed.

A beam current is detected as a potential drop when IA flows through a detection resistor R1 and a current detection circuit 5 outputs a detected voltage VDET1 to the maximum value selection circuit 9. On the other hand, the current detection circuit 7 detects the cathode currents of the color CRTs and outputs the detected cathode currents to the maximum value selection circuit 8, which then selects the maximum value from among the input detection values and outputs the maximum value to the maximum value selection circuit 9. The maximum value selection circuit 9 inputs the maximum detection value of the cathode currents and VDET1, selects the maximum detection value or VDET1, whichever is the greater, and outputs the selected one to a comparison circuit 6. When the beam current of any of the CRTs reaches a predetermined value, the detected cathode current is input through the maximum value selection circuit 8 to the maximum value selection circuit 9. The gain of the current detection circuit 7 is set so that detection value larger than the VDET1 is taken. The maximum value selection circuit 9, which inputs large cathode current detection signal, outputs it as VDET2 to the comparison circuit 6. The comparison circuit 6 sends excessive-level detection signal to a signal processing circuit 1, which then changes the contrast (or) brightness of a television signal, thereby lessening the average level of output R, G, and B signals. As a result, the average level of cathode currents IKR, IKG, and IKB is lessened and the beam current is limited.

FIG. 17 is a three-axis graph to show the range in which the cathode currents of the three CRTs are limited by the current limiting circuit in the second related art. The inside of a cube having one corner at an origin O with its opposite angle cut by TRI1 is the range in which the cathode currents can be changed. When a blue plane signal is input, IKB is limited to the current value indicated by P3 in the figure. IKR and IKG are also limited in a similar manner. When a white plane signal is input, limit is made to the current indicated by a point P1. The point P3 becomes drastically smaller as the value of IKB than a point P2, and for various signals, the beam current can be limited within the rated value of CRT.

FIG. 18 shows examples of a program guide menu displayed on a screen and signal waveforms. In the figure, PIC1 denotes a menus screen, A1 denotes a menu name display area, A2 denotes a menu content display area with white text on a blue background, A3 denotes a blue area as the menu background, V3 denotes a line representing a change in blue signal level with time for one scanning line of signals making up the menu, V4 denotes a line representing a change in red and green signal levels with time, and C1 denotes an area in which signal level changes finely corresponding to text. Since A3 is blue, the blue signal level is high in the whole time range of T2 and since the text is white, the case is almost the same as the case where blue plane signal is input. Red and green signals are at low level other than the text and become at large level only in the period of the text, but are at small level on average. When such a menu screen is input, the beam current is limited to the level indicated by P3 in FIG. 17.

Various menu screen colors are available and display time and frequency also vary. A menu consisting mainly of green and a menu having an area of a fundamental color in combination may be input. The beam current of each CRT is limited to a predetermined value for any combinations. Therefore, the light emission intensity of the CRT with a large beam current is lowered in accordance with the curve shown in FIG. 14 in response to the cumulative time of menu display. If a menu using areas of different colors in combination is used over a long period of time, the light emission intensity of the phosphor is also lowered for each color area. A similar problem also occurs in a computer signal and a blue mute signal in addition to the menu, as described above.

FIG. 19 shows a CRT beam current limiting circuit in a third related art. Components identical with those previously described with reference to FIG. 11 are denoted by the same reference numerals in FIG. 19. Numeral 30 denotes a calculation circuit and numeral 31 denotes a correction circuit. The operation of the components different from those previously described with reference to FIG. 11 will be discussed.

The calculation circuit 30 inputs a fundamental color signal before being amplified by an amplification circuit 2 and finds the beam current of each color CRT by calculation. If the calculation result indicating that an excessive current flows is found, the calculation circuit 30 outputs a detection signal to the correction circuit 31. Upon reception of VDET1, a signal of the result of detecting an anode current, the correction circuit 31 corrects the VDET1 based on the detection signal output by the calculation circuit 30 and outputs a control signal to a signal processing circuit 1.

According to the beam current limiting circuit in the first related art, the current of the total value of the anode currents is detected. Thus, for example, if a blue signal is input, the flow of the beam current largely exceeding the rated average current of CRT concentrates onto one blue CRT and the reliability of the parts is degraded or the parts are broken; this is a problem.

In the second related art example, the cathode current of each color and the total anode current are detected and are limited so that they are placed in predetermined ranges. Thus, the beam current can be limited so as not to exceed the rated value of the average beam current of CRT; however, if each cathode current is limited to a constant value across the board, the current of a normal image is also limited and the dynamic range of the beam current is lessened, decreasing the power of a display image; this is a problem.

In the third related art example, the cathode current itself is not detected and the beam current is estimated by calculation and thus current limiting cannot be executed with high accuracy because the actual beam current receives the effects of a gain error of the amplifier at the following state and a cutoff adjustment error of the beam current; this is a problem.

The following problem is common to the related art examples: A configuration method of a cutoff automatic adjustment circuit of CRT beam current is not disclosed and if a beam cutoff current detection circuit is configured independently of a circuit for detecting a large beam current, the circuitry becomes complicated and the costs are increased or the reliability is degraded.

The beam current limiting circuits in the related arts detect the average value or the peak value of currents and basically limit the current based on the signal waveform in the time range within several frames. In recent years, various signal sources have been displayed on a video projector and the occasions of producing screen display consisting mainly of text and graphics such as a program guide and a computer screen have occurred increasingly, in which case text and graphics are displayed in the screen consecutively over several ten frames as a fixed pattern. When a color area of a reasonable size is displayed stationarily like a menu screen, if the beam current of each CRT is less than the rated current, the current difference among the CRTs is large depending on the color arrangement of the screen and as the projector is used for a long period of time, the intensity of the phosphor area of the CRT with a large average current is degraded and a phenomenon in which a different color from the original image color is attached to a part or the whole of the screen, so-called screen phosphor burn-in occurs; this is a problem.

SUMMARY OF THE INVENTION

It is therefore an object of the invention to provide a beam current limiting circuit with high reliability at low costs according to a simple configuration integral with cutoff current detection means and improve the beam current limit characteristic for providing a video projector capable of displaying various signals brightly and suppressing screen phosphor burn-in.

According to the invention, there is provided a beam current limiting circuit of a video projector comprising current detection means for detecting a cathode current of each of a plurality of CRTs used with a video projector, wherein the current detection means is used to adjust a current in a black image (cutoff current) on the CRT and limit a beam current flowing into the CRT.

The current detection means for detecting the cathode current comprises a first resistor being inserted to a cathode current passage of each CRT for detecting the black image current (cutoff current) and a second resistor being inserted to the cathode current passage of each CRT for detecting the beam current flowing into the CRT, the first and second resistors being connected in series.

The beam current limiting circuit further comprises current detection means for detecting CRT anode current, wherein the current detection means is used to limit the beam current flowing into the CRT.

When the motion of an image displayed on CRT is small, the cathode current is limited more than when the motion of an image displayed is large.

The beam current limiting circuit further comprises means for detecting a change in anode current with time, wherein when the means for detecting a change of anode current with time determines that current change is small over a predetermined period of time, the cathode current is more limited.

The means for detecting time change of anode current comprises analog-digital conversion means for inputting a detection signal of the anode current and a microcomputer being connected to the analog-digital conversion means.

The beam current is limited so that the difference between the maximum value and the minimum value of the cathode currents of the CRTs becomes within a predetermined value.

The beam current limiting range is corrected based on the peak value of the CRT beam current.

BRIEF DESCRIPTION OF THE DRAWINGS

Brief Description of the Drawings

Figure 1:
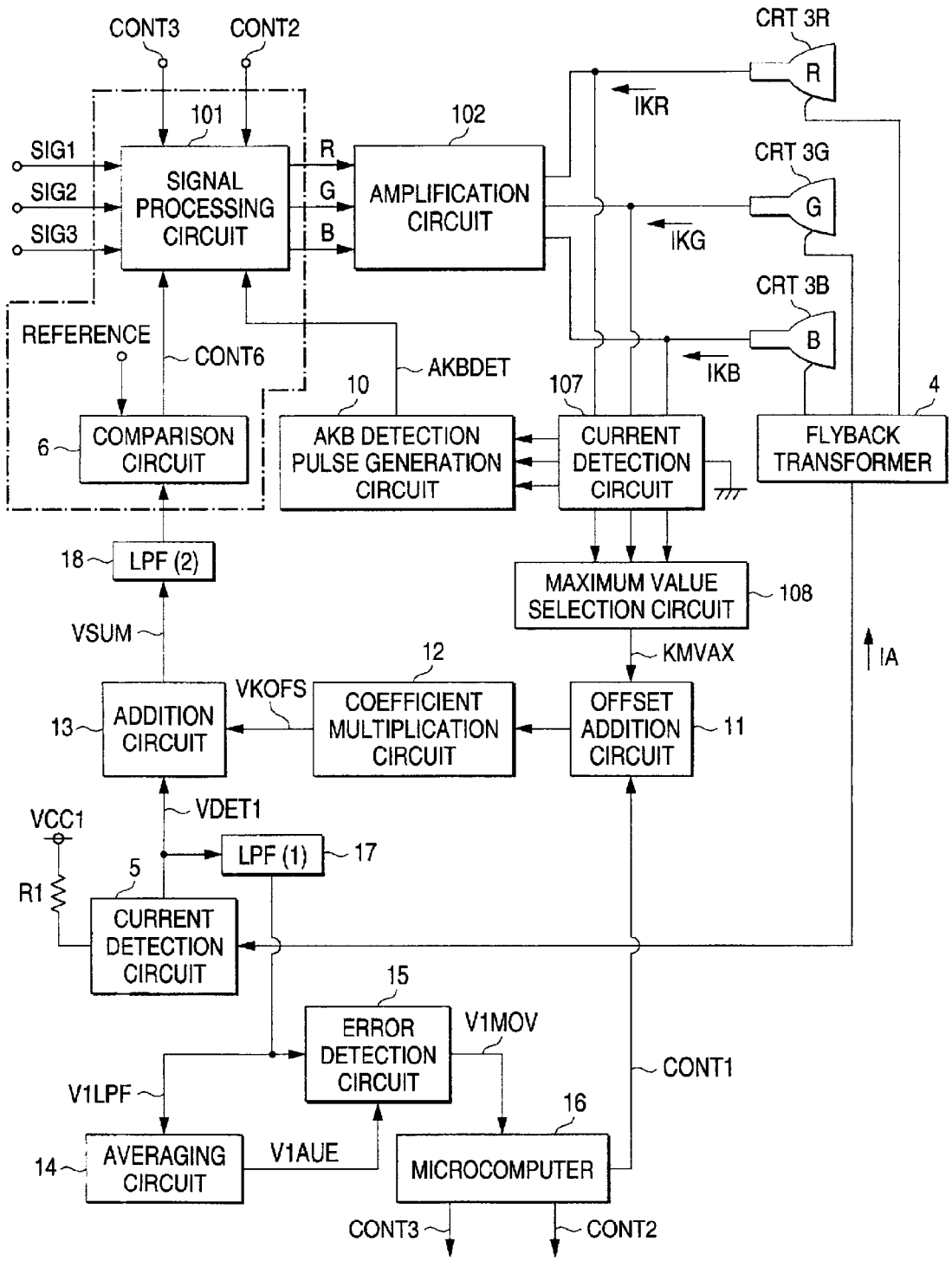
Figure 2:
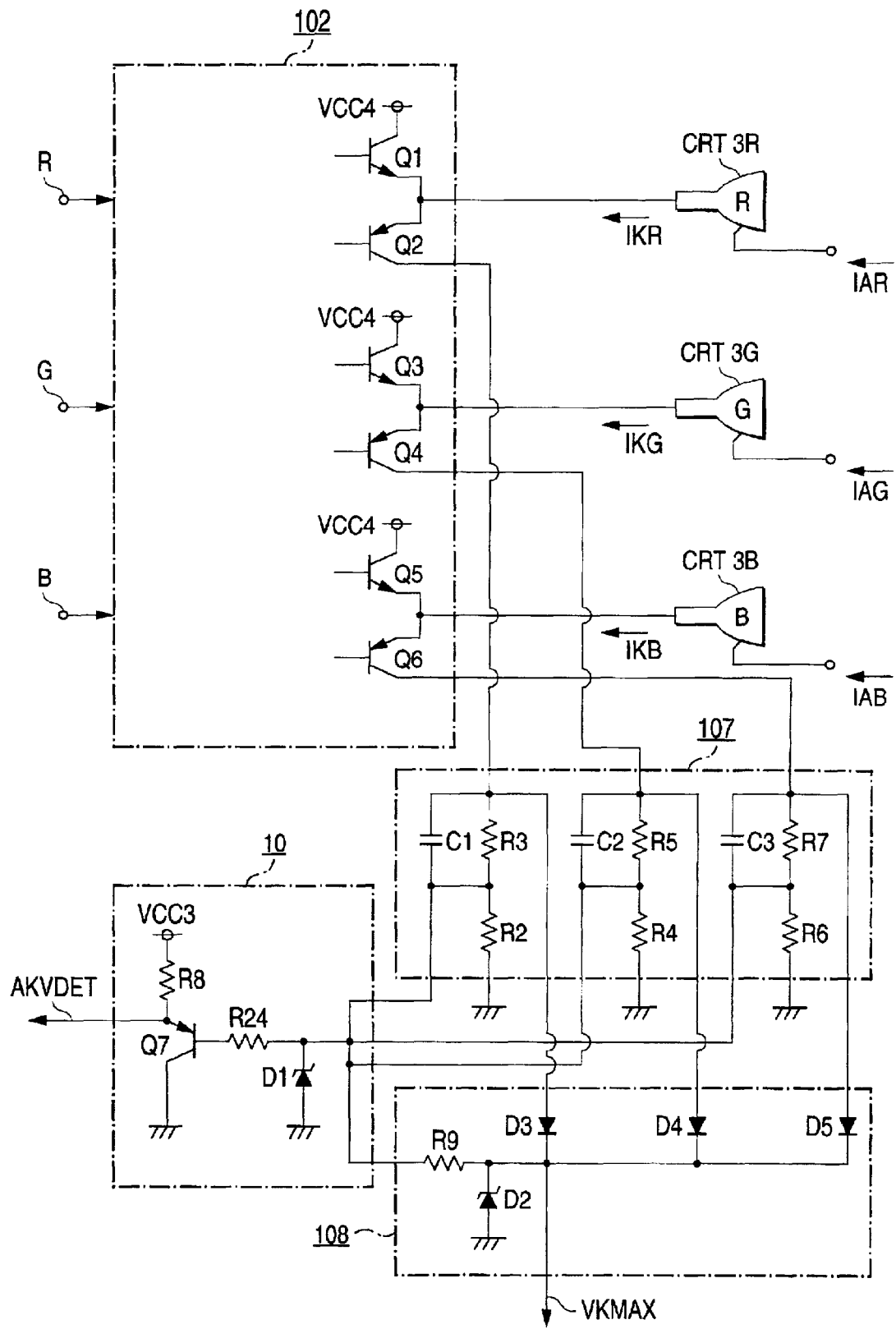
Figure 3:
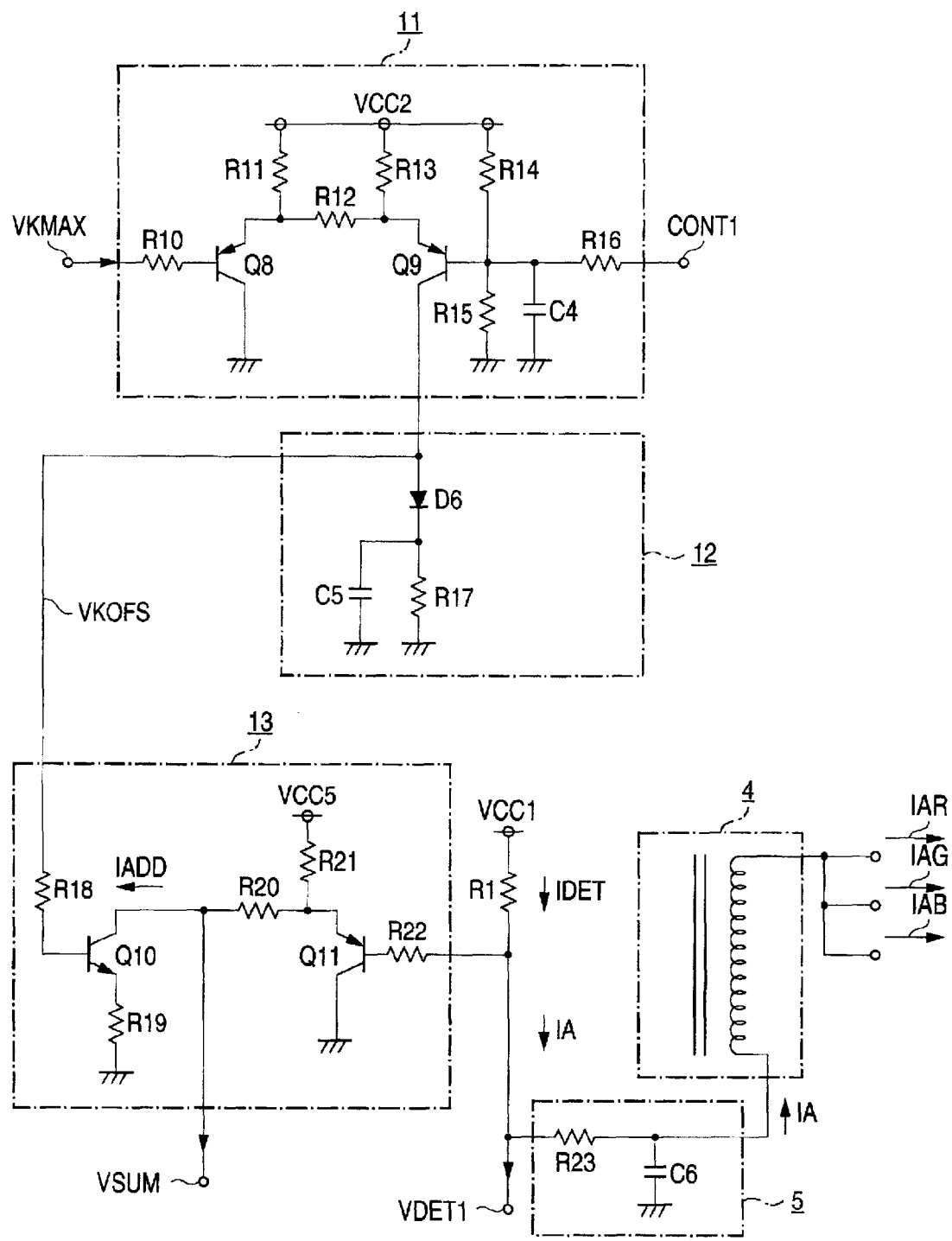
Figure 4:
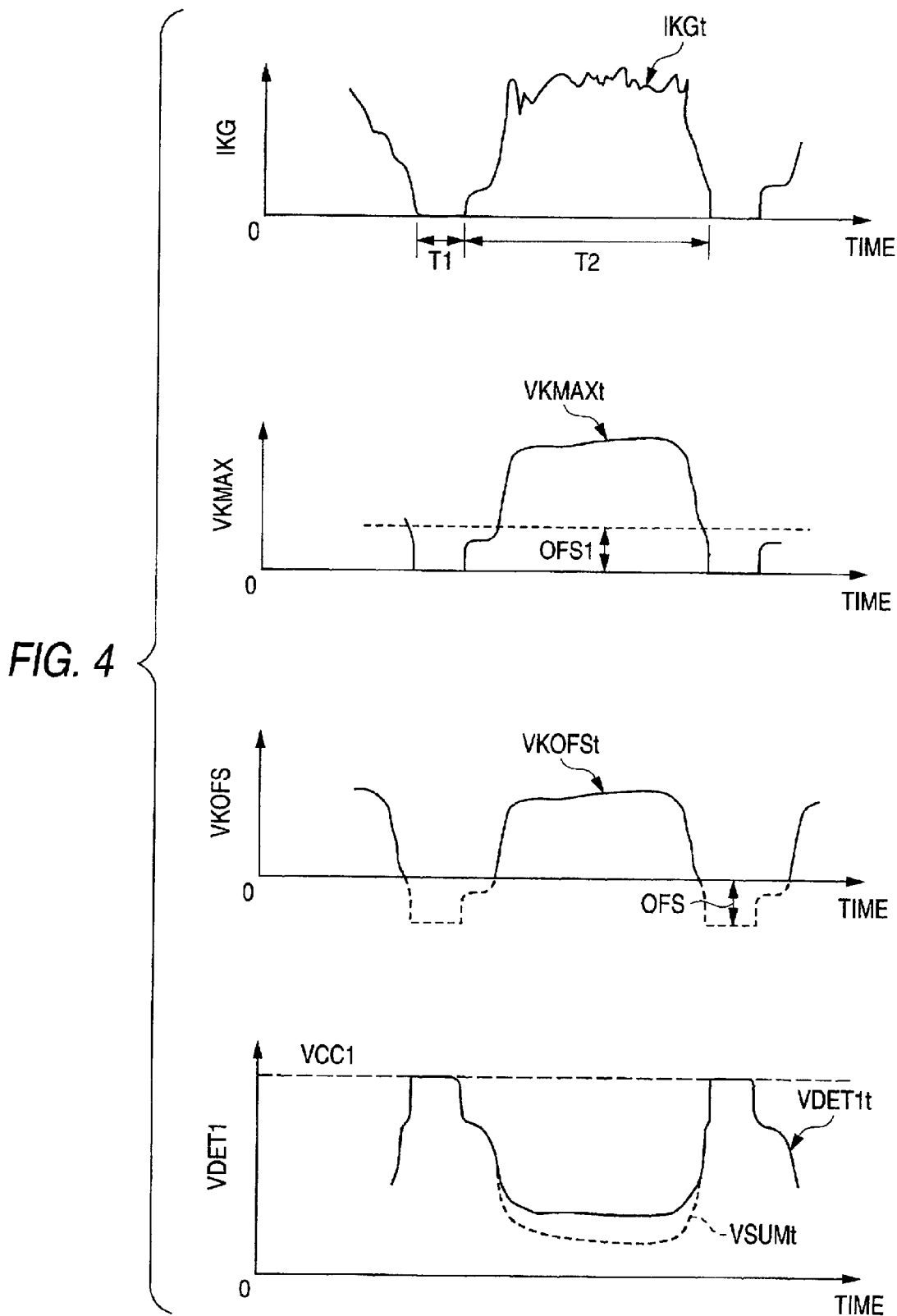
Figure 5:
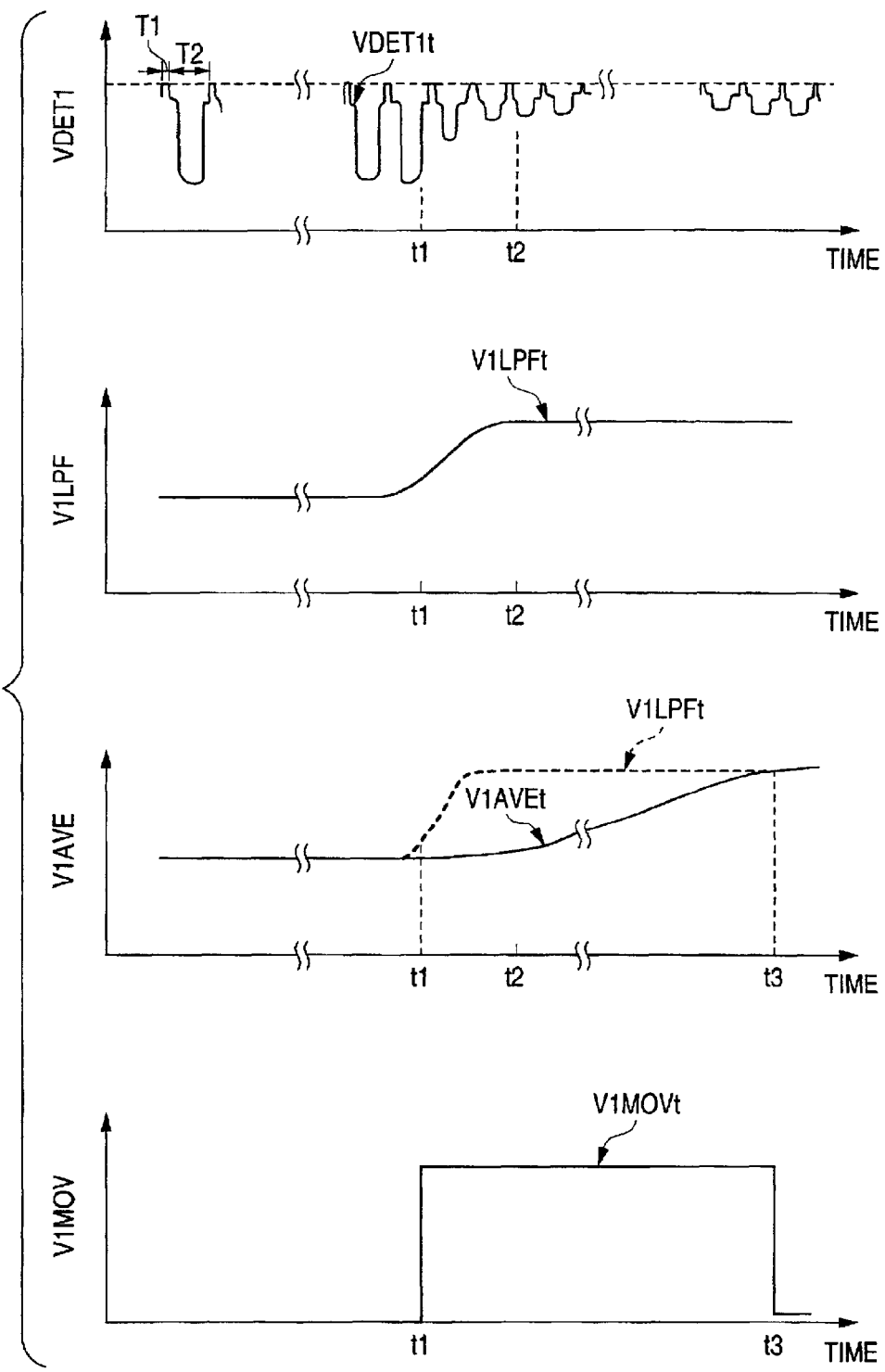
Figure 6:
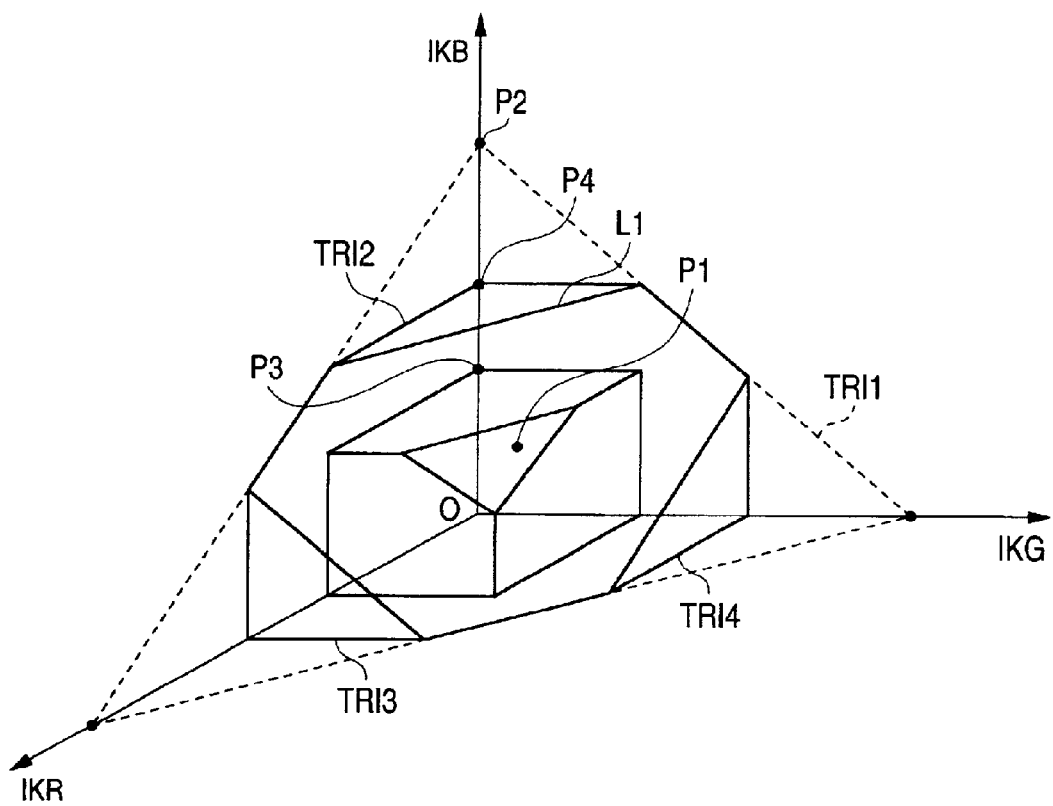
Figure 7:
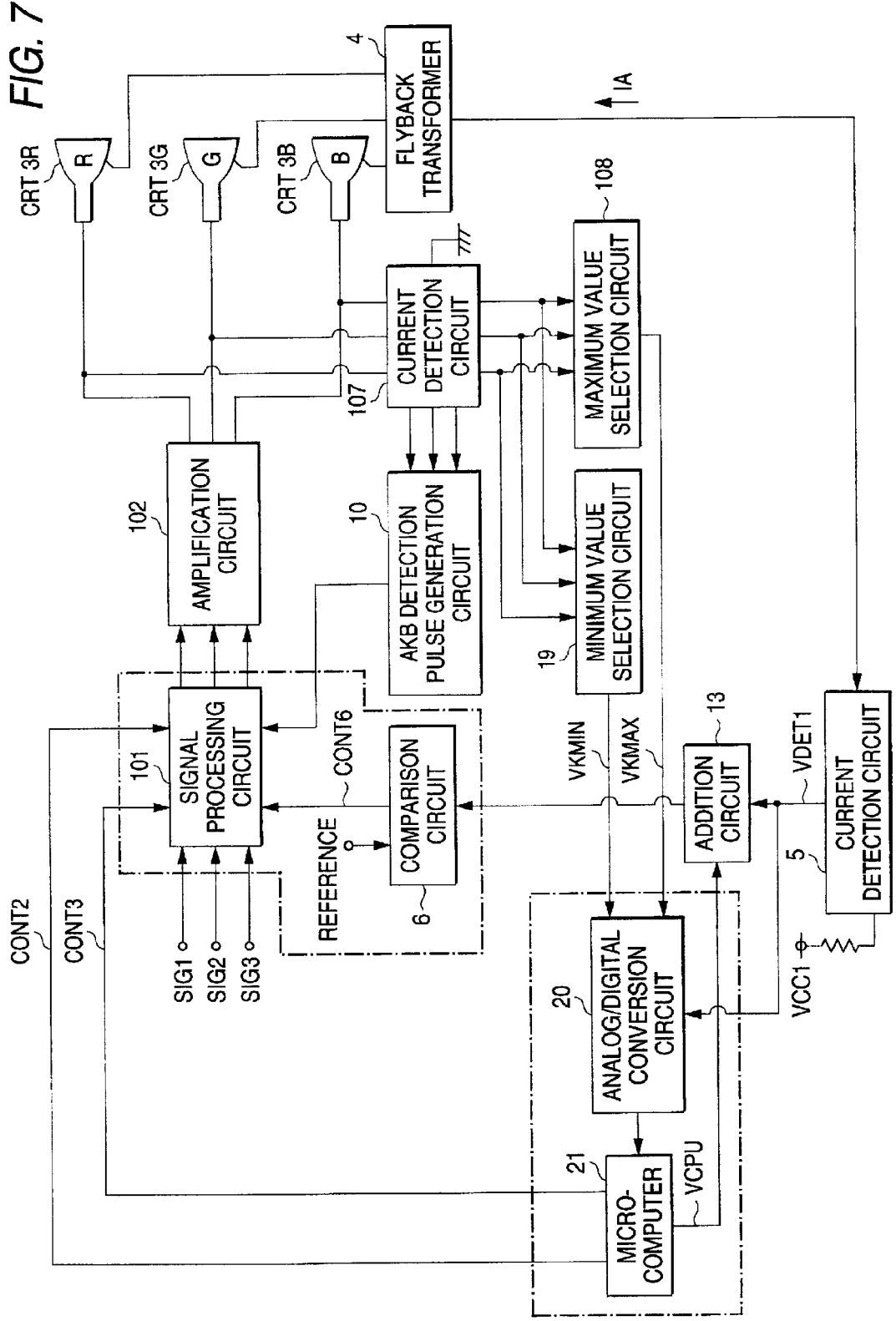
Figure 8:
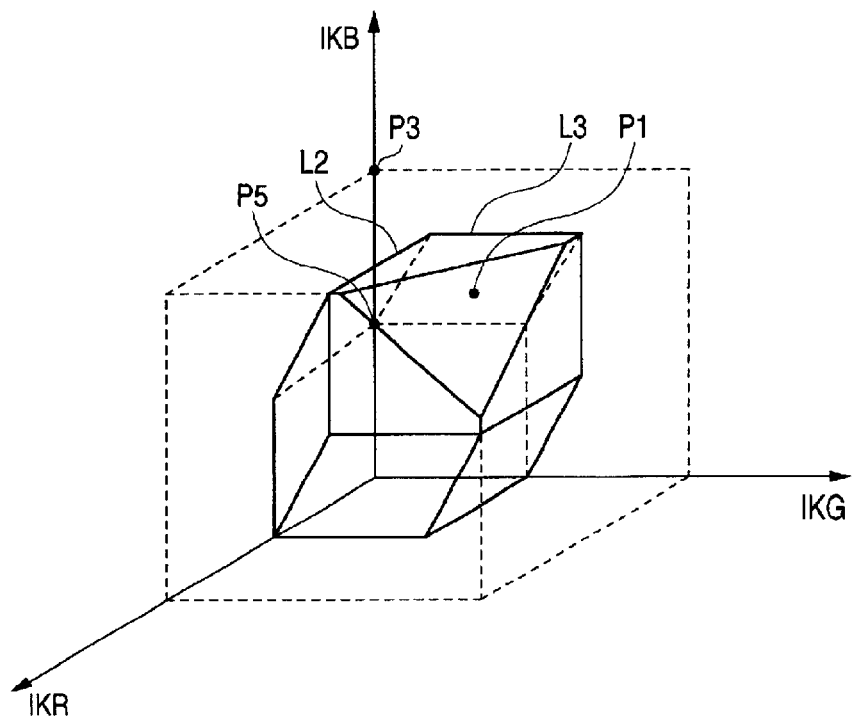
Figure 9:
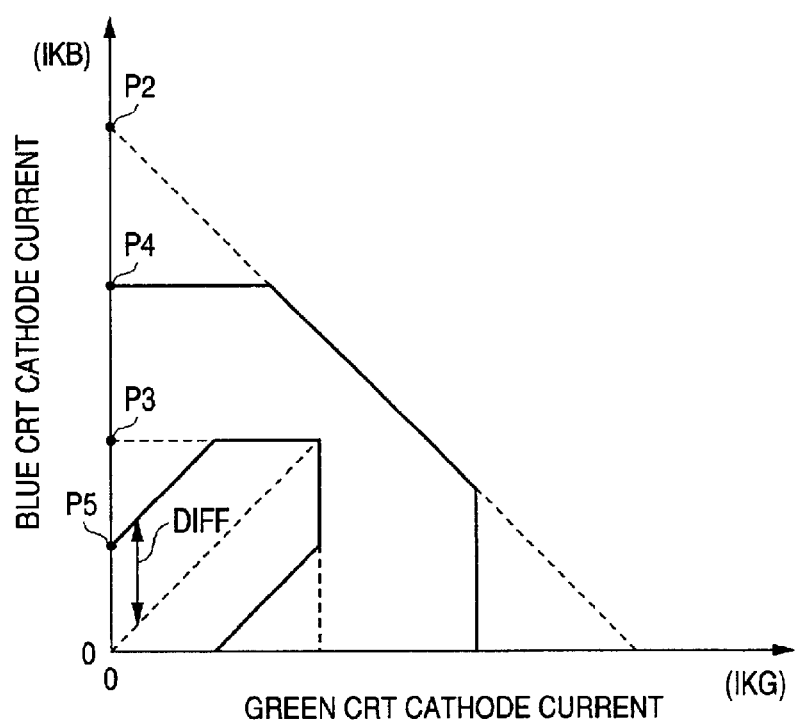
Figure 10:
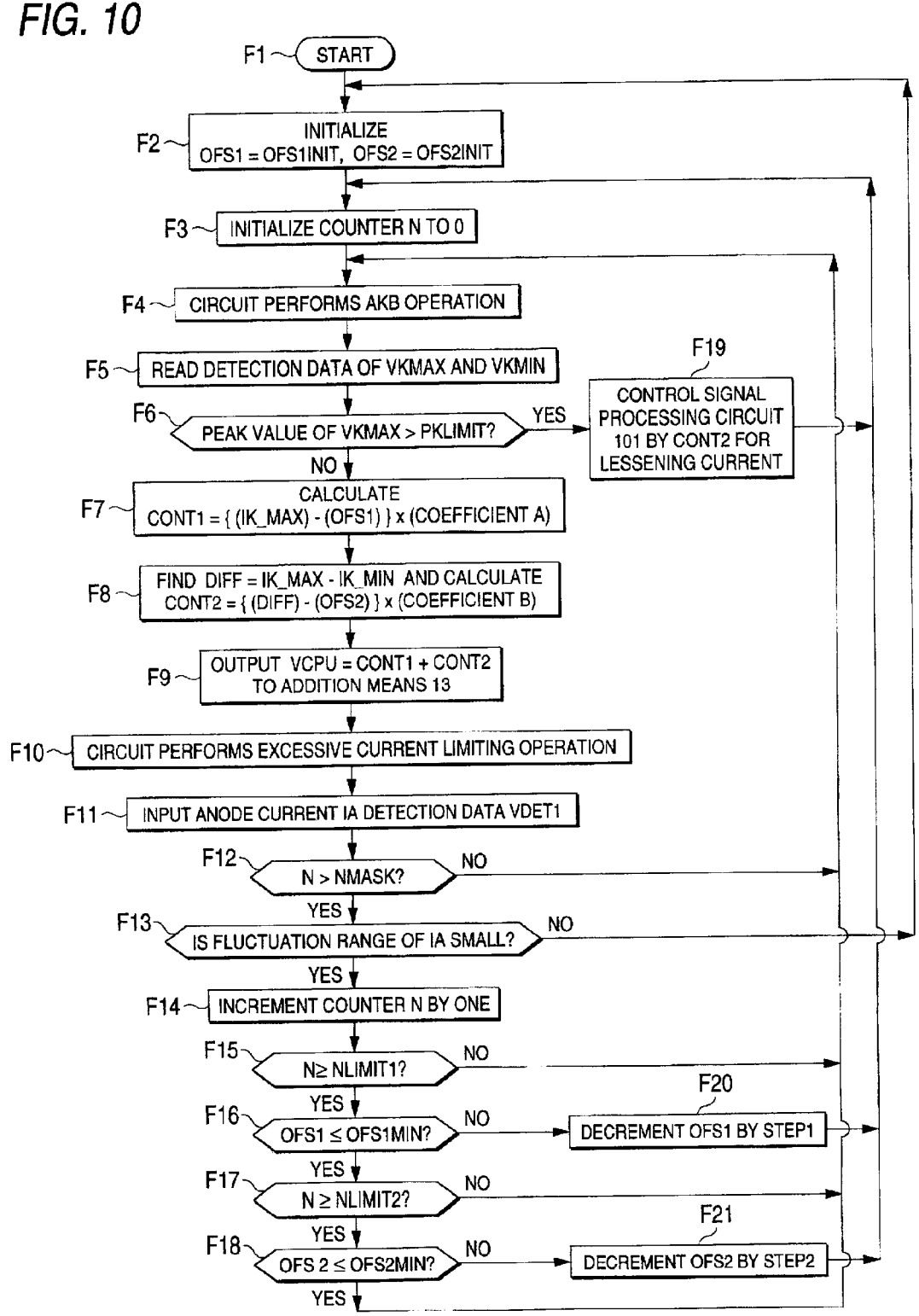
Figure 11:
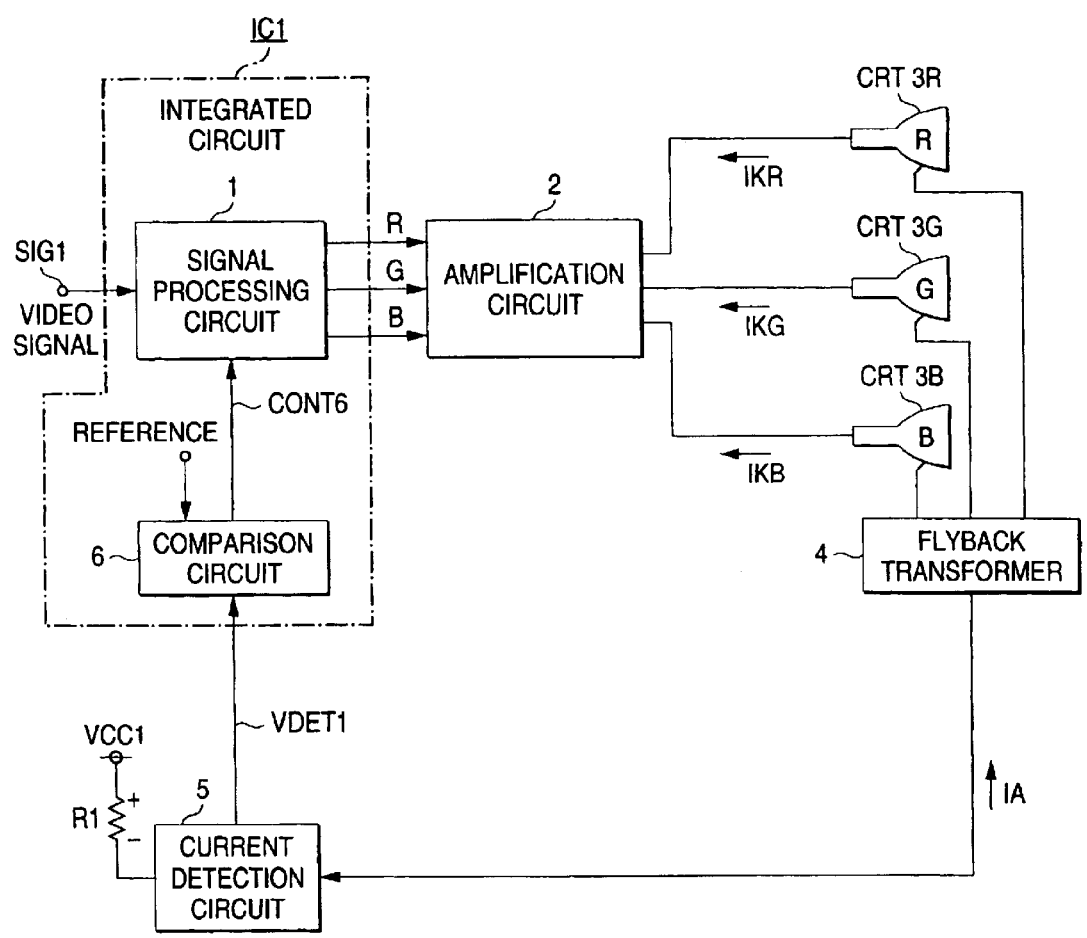
Figure 12:
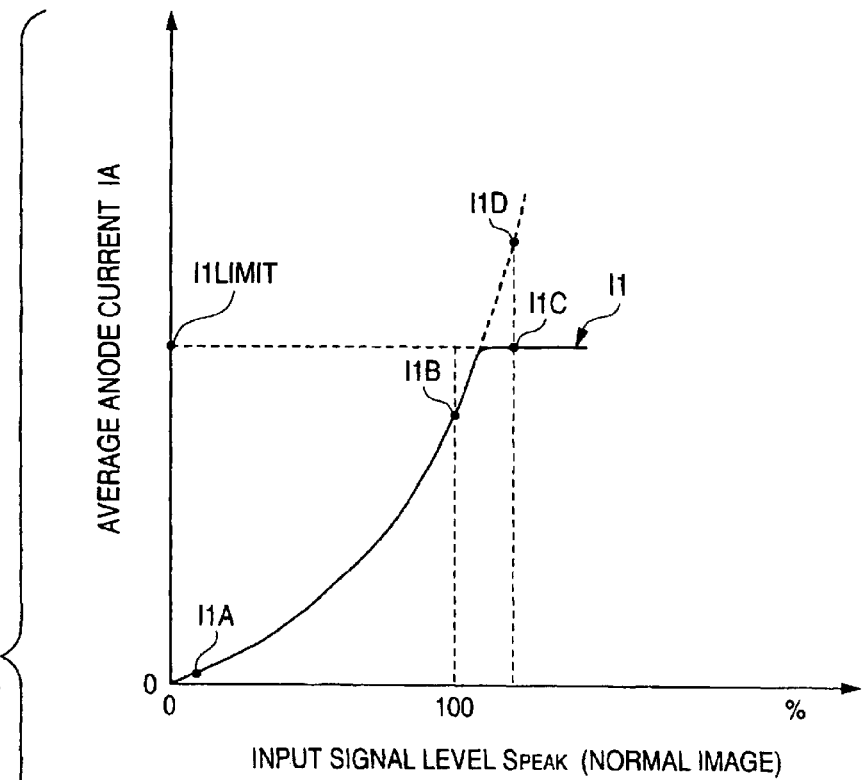
Figure 12:
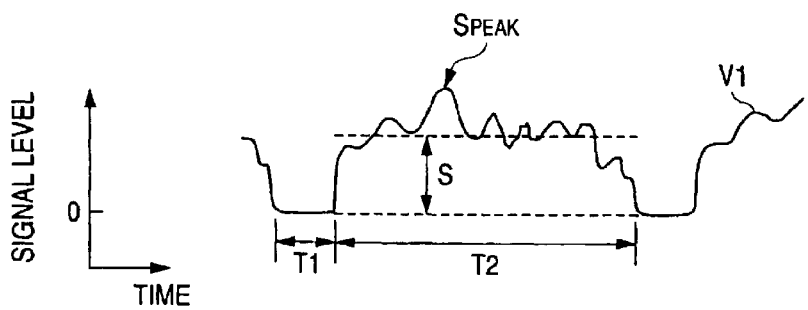
Figure 13:
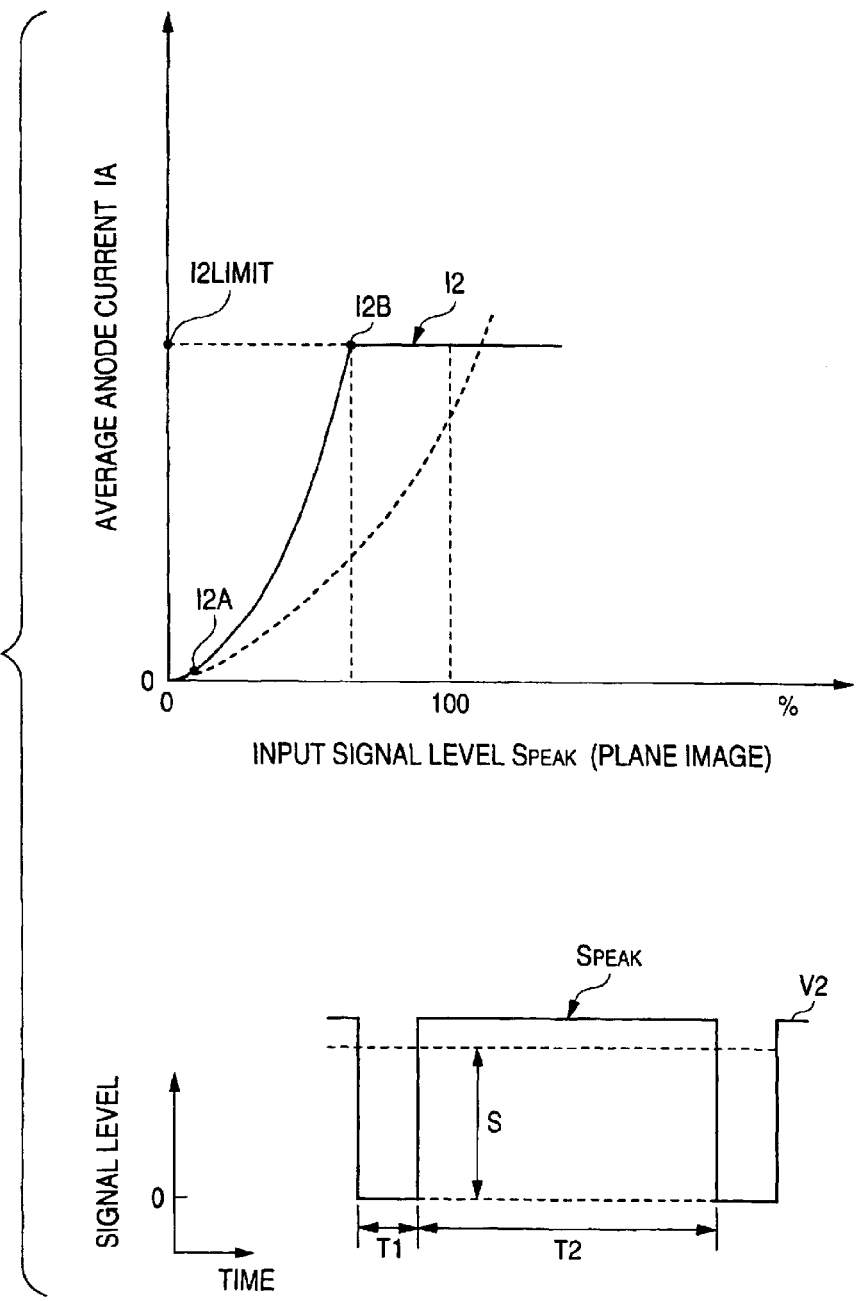
Figure 14:
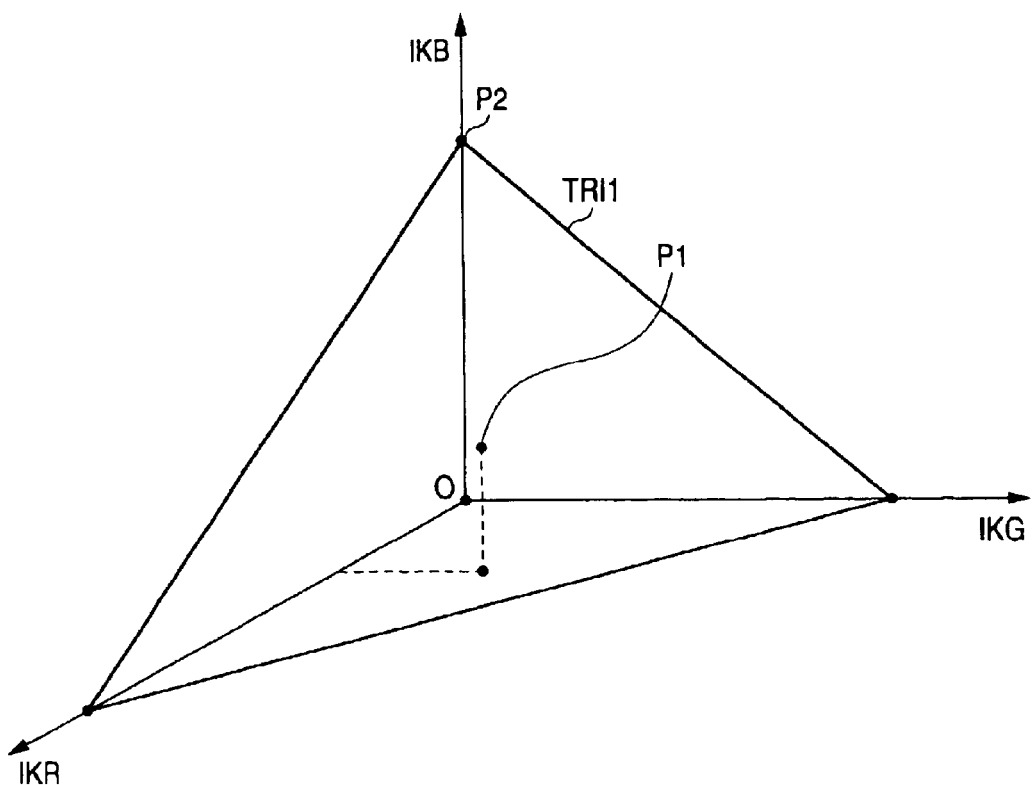
Figure 15:
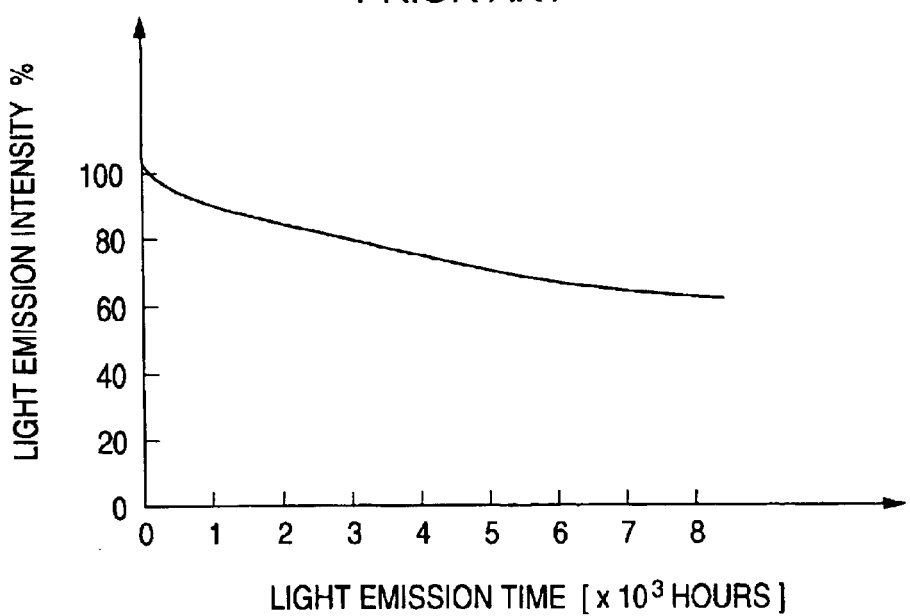
Figure 16:
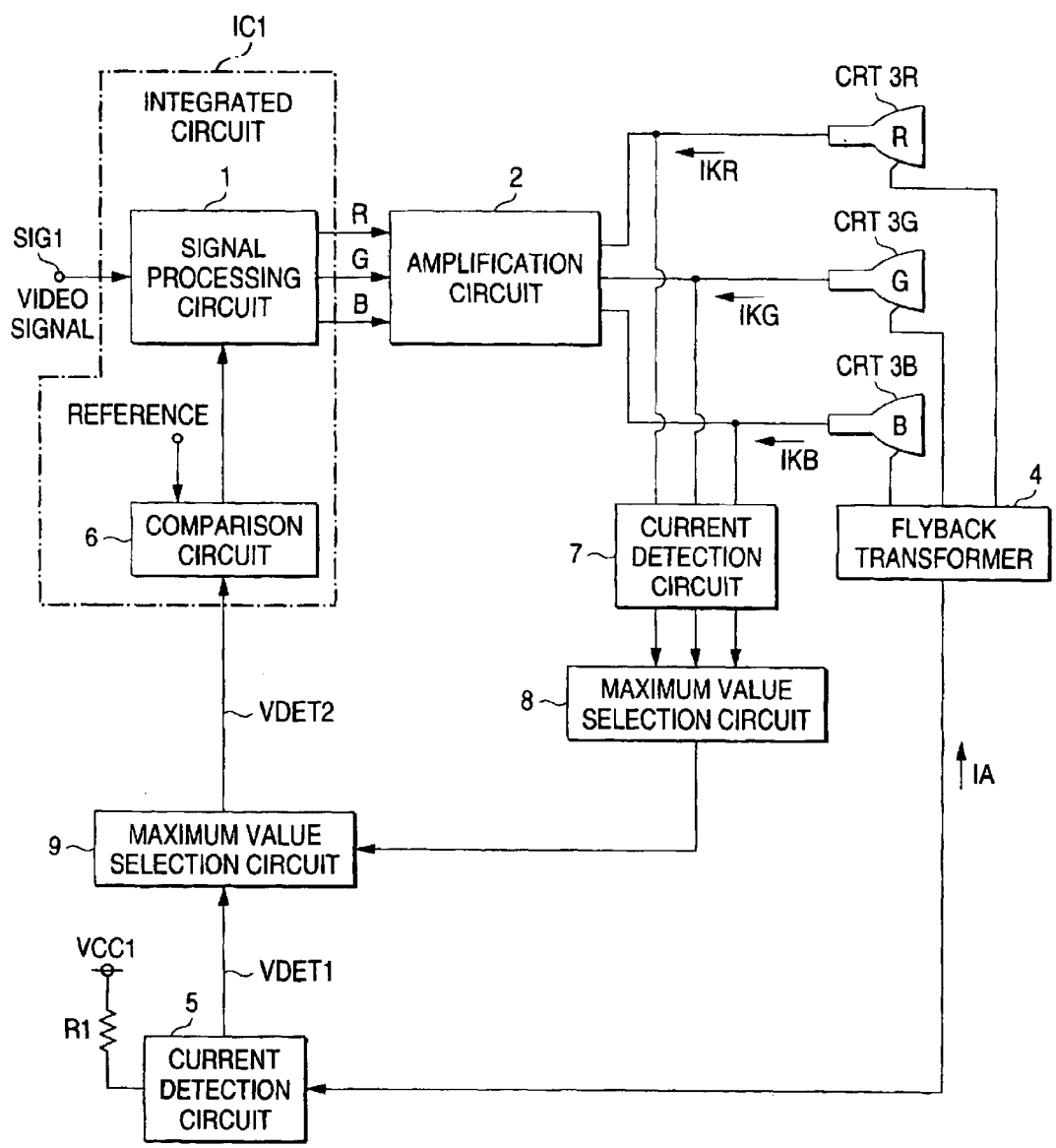
Figure 17:
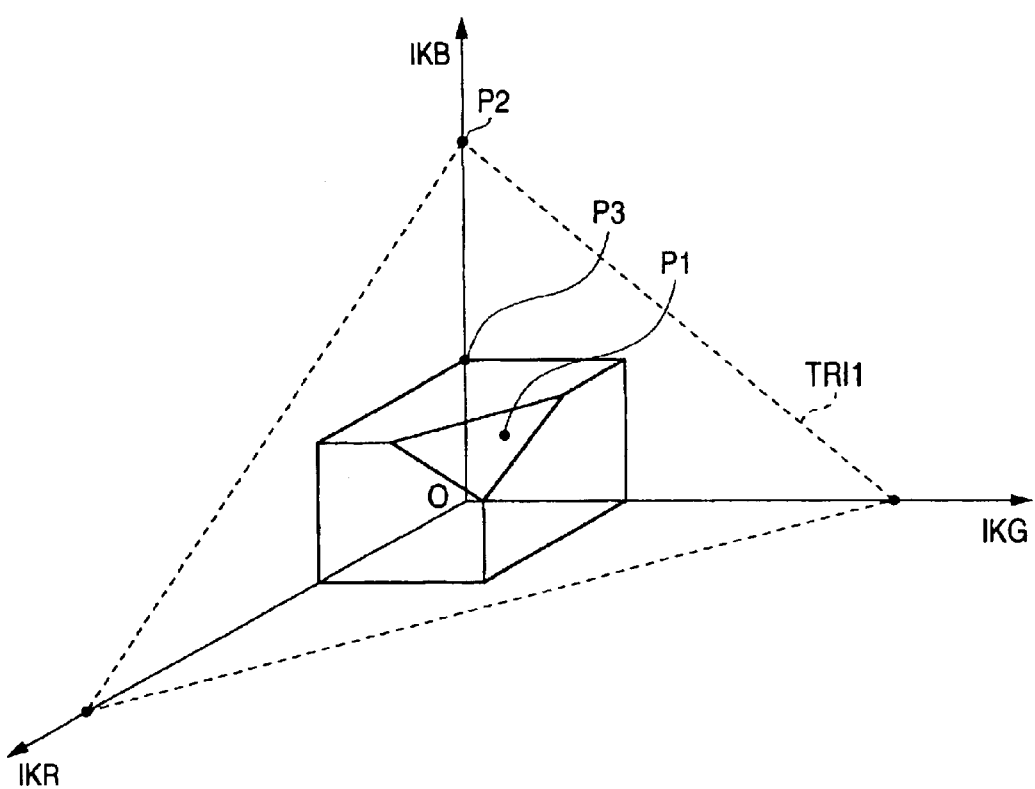
Figure 18:
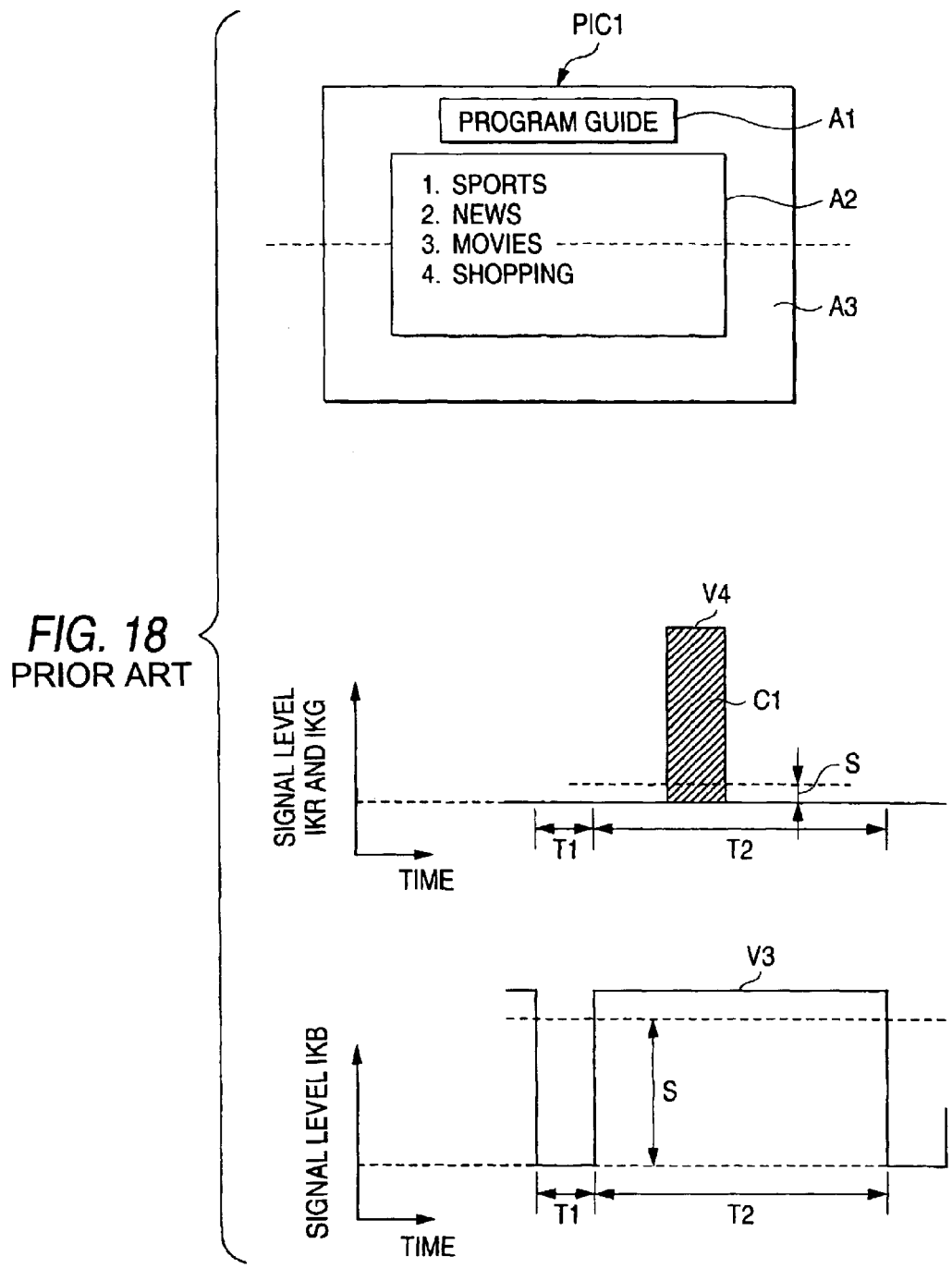
Figure 19:
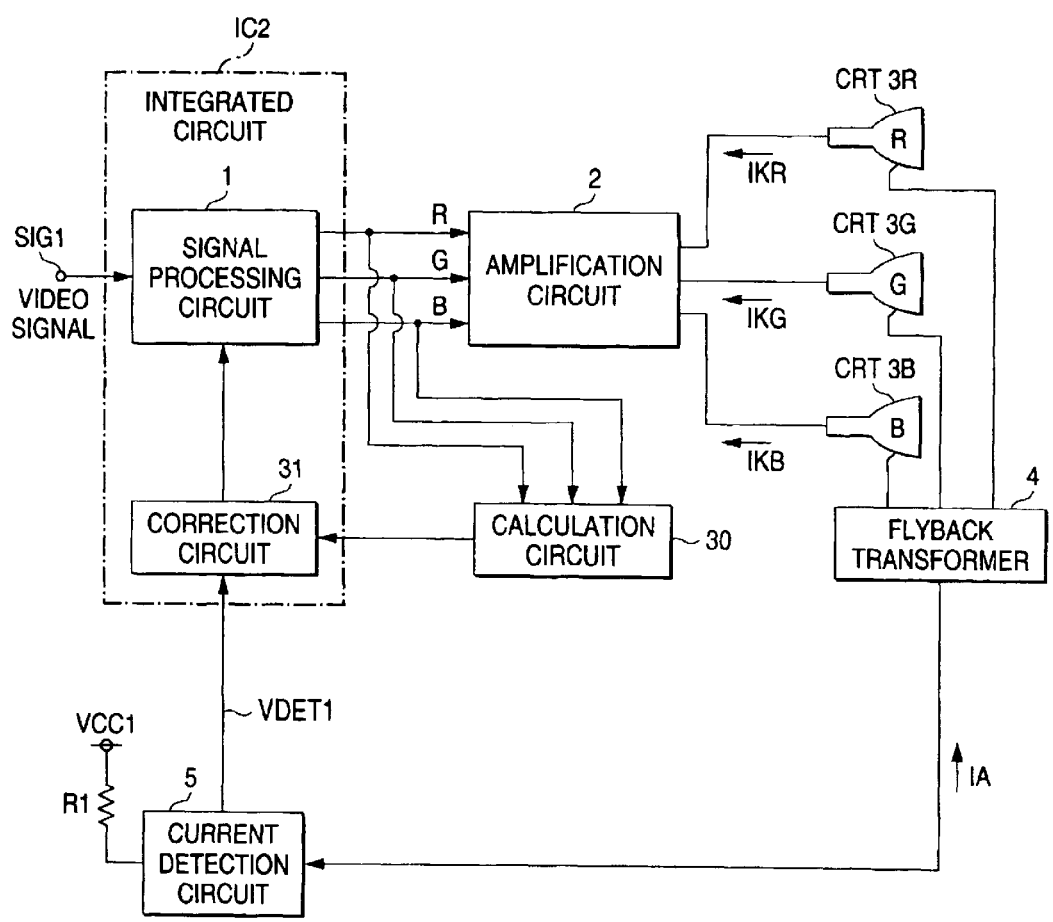

In the accompanying drawings:

FIG. 1 is a block diagram to show a beam current limiting circuit for a video projector according to a first embodiment of the invention;

FIG. 2 is a partial circuit diagram of the beam current limiting circuit according to the first embodiment of the invention;

FIG. 3 is a partial circuit diagram of the beam current limiting circuit according to the first embodiment of the invention;

FIG. 4 is a drawing to show signal forms in the circuit according to the first embodiment of the invention;

FIG. 5 is a drawing to show signal forms in the circuit according to the first embodiment of the invention FIG. 6 is a three-dimensional view to show the current limit range in the first embodiment of the invention;

FIG. 7 is a block diagram to show a beam current limiting circuit for a video projector according to a second embodiment of the invention;

FIG. 8 is a three-dimensional view to show the range in which the cathode currents of CRTs are limited by current limiting circuit in the second embodiment of the invention;

FIG. 9 is a drawing to represent the change region of a current limit range in the second embodiment of the invention;

FIG. 10 is a flowchart to represent a routine of the current limiting operation in the second embodiment of the invention;

FIG. 11 is a block diagram to show the configuration of a first example of a beam current limiting circuit in a related art;

FIG. 12 is a drawing to show the relationship between input signal level and average beam current of CRT in the first example of the beam current limiting circuit in the related art;

FIG. 13 is a drawing to show the relationship between input signal level and average beam current of CRT when a plane signal is input in the first example of the beam current limiting circuit in the related art;

FIG. 14 is a three-dimensional view to show the range in which the cathode currents of color CRTs are limited by current limiting circuit in the first example of the beam current limiting circuit in the related art;

FIG. 15 is a graph to show an example of the relationship between light emission intensity and light emission time of CRT phosphor of a video projector;

FIG. 16 is a block diagram to show the configuration of a second example of a beam current limiting circuit in a related art;

FIG. 17 is a three-dimensional view to show the range in which the cathode currents of color CRTs are limited by current limiting circuit in the second example of the beam current limiting circuit in the related art;

FIG. 18 is a drawing to show the relationship between menu screen display of a television and average current of color CRTs; and FIG. 19 is a block diagram to show the configuration of a third example of a beam current limiting circuit in a related art.

DETAILED DESCRIPTION OF THE PREFERRED EMBODIMENTS

Now, a description will be given in more detail of preferred embodiments of the invention with reference to the accompanying drawings.

(First Embodiment)

FIG. 1 is a block diagram to show a beam current limiting circuit for a video projector according to a first embodiment of the invention. In the figure, numeral 101 denotes a signal processing circuit, numeral 102 denotes an amplification circuit, numeral 107 denotes a current detection circuit, numeral 108 denotes a maximum value selection circuit, numeral 10 denotes an AKB detection pulse generation circuit, numeral 11 denotes an offset addition circuit, numeral 12 denotes a coefficient addition circuit, numeral 13 denotes an addition circuit, numeral 14 denotes an averaging circuit, numeral 15 denotes an error detection circuit of time change detection means of current, numeral 16 denotes a microcomputer of control means, numeral 17 denotes a low-pass filter (LPF) (1), and numeral 18 denotes a low-pass filter (LPF) (2).

The following signals are input to the signal processing circuit 101: SIG2 is an image signal much containing graphics and text generated by a computer, etc., SIG3 is a menu signal of a program menu, etc., CONT2 is a beam current limit level control signal, and CONT3 is an input signal switch control signal. The following signals are output by the microcomputer 16: CONT1 is a control signal input to the offset addition circuit 11 for switching an offset value, CONT2 is a control signal input to the signal processing circuit 101 for switching the limit level of a CRT beam current, and CONT3 is a control signal input to the signal processing circuit 101 for selecting any of SIG1, SIG2, or SIG3.

FIG. 2 is a circuit diagram of the main portions of the components 102, 107, 108, and 10 in the block diagram of FIG. 1. In FIG. 2, Q1 to Q6 denote transistors making up SEPP (single ended push pull) at the output stage of the amplification circuit, R2, R4, and R6 denote black image current (cutoff current) detection resistors, R3, R5, and R7 denote average current detection resistors, C1 to C3 denote smoothing capacitors, D1 denotes a voltage limit Zener diode, Q7 denotes a transistor for outputting an AKB detection pulse, R24 denotes an oscillation prevention base resistor of the transistor Q7, R8 denotes an emitter resistor of the transistor Q7, D3 to D5 denote diodes, R9 denotes a maximum value detection resistor, and D2 denotes a voltage limit Zener diode.

FIG. 3 is a circuit diagram of the main portions of the components 11, 12, 13, 5, and 4 in the block diagram of FIG. 1. In FIG. 3, Q8 denotes a transistor for implementing a buffer amplifier, Q9 denotes a transistor for implementing a common base amplifier, R10 denotes an oscillation prevention resistor of the transistor Q8, R11 denotes an emitter resistor of the transistor Q8, R12 denotes a flow-in current level setting resistor to the emitter of the transistor Q9, R13 denotes an emitter resistor of the transistor Q9, R14 and R15 denote base bias setting resistors of the transistor Q9, C4 denotes a noise removal capacitor, R16 denotes a noise removal resistor, R17 denotes a load resistor of the amplifier implemented as the transistor Q9, D6 denotes a temperature drift compensation diode, C5 denotes a smoothing capacitor, Q10 denotes a voltage-current conversion transistor, Q11 denotes a transistor for implementing a voltage buffer amplifier, C6 denotes a high-frequency current bypass capacitor, R23 denotes a low-frequency current transmission resistor, R18 denotes an oscillation prevention resistor of the transistor Q10, R19 denotes an output current gain setting resistor of the transistor Q10, R22 denotes an oscillation prevention resistor of the transistor Q11, R21 denotes an emitter resistor of the transistor Q11, and R20 denotes a load resistor of output current of the transistor Q10. In FIGS. 1 to 3, VCC1 to VCC5 denote DC power supplies.

The operation of the components different from those in the related art examples will be discussed. In FIG. 1, the signal processing circuit 101 selectively inputs the connected signal SIG1, SIG2, or SIG3. At this time, which of the signals is selected is determined by the control line CONT3. The signal processing circuit 101 converts the input image signal into a fundamental color signal and further corrects the contrast and the brightness to setup values, then outputs the signal to the amplification circuit 102. The amplification circuit 102 inputs the fundamental color signal, amplifies the signal level, and voltage-drives the cathode of CRT, thereby allowing a cathode current to flow out from the cathode. Green CRT will be discussed in detail.

As shown in FIG. 2, cathode current IKG flowing out from the green CRT 3G is transmitted from the emitter of the suction transistor Q4 to the collector of the transistor Q4 and is output to the average current detection resistor R5 and the cutoff current detection resistor R4 in order and finally flows into ground. The resistor R4, which is a comparatively large resistor of about 68 KΩ, converts a cathode current at a minute level corresponding to an AKB detection video signal into a sufficiently large voltage and outputs the voltage into the base of the transistor Q7. The transistor Q7, to which the provided voltage is input, serves as a voltage buffer and outputs an AKBDET signal from the emitter to the signal processing circuit 101.

The diode D1 is a Zener diode having an anode connected to ground and limits the voltage across the resistor R4 to a given level or less, thereby protecting the transistor Q7 and the signal processing circuit 101. The Zener voltage of the diode D1 is a little higher than the level of the AKBDET signal and thus has no effect on AKB detection. The resistor R5 has a resistance value of several KΩ and detects the average current of cathode currents. The capacitor C2 connected in parallel to the resistor R5 forms a low-pass filter together with the resistor R5 so as not to detect the current corresponding to high frequency of image signal.

The transistor Q4 collector voltage of the resistor R5 is input to the anode of the diode D4 and the cathode of the diode D4 transmits the anode voltage to the resistor R9 if the diode D4 is on. The voltage of any of the diodes D3 to D5 having the highest cathode voltage is transmitted to the resistor R9. Consequently, the maximum value of the three CRT cathode voltages is input to the resistor R9 through which the voltage is input to the offset addition circuit 11 as VKMAX.

The resistor R9 has another terminal connected to the cathode of the diode D1 for transmitting all currents flowing into the resistor R9 to the cutoff current detection resistors R2, R4, and R6, so that when AKB detection operation is performed, if minute current detection is executed, an error is not caused to occur. The signal VKMAX becomes a voltage resulting from adding the maximum voltage value across the resistor R3, R5, or R7 to the Zener voltage of the diode D1. The Zener voltage of the diode D1 contained in the VKMAX signal is removed by the offset addition circuit 11 and thus does not affect detection of cathode current. The diode D2 is a Zener diode having an anode connected to ground and limits the maximum value of the VKMAX to a given voltage, thereby protecting the current detection circuit 107, the maximum value selection circuit 108, and the offset addition circuit 11 from an excessive voltage.

In FIG. 3, the signal VKMAX is input through the resistor R10 to the base of the transistor Q8. The transistor Q8 operates as a voltage buffer and the emitter of the transistor Q8 is voltage-driven in response to base input. The transistor Q9 is a common-base amplifier in which the base voltage can be controlled by the voltage of the CONT1 signal, and the emitter voltage of the transistor Q8 is transmitted with the voltage gain determined by the ratio between the resistor R12 and collector impedance in the range in which the emitter current of the transistor Q9 does not become zero. The diode D6 and the resistor R17 are connected in series to the collector of the transistor Q9 and the capacitor C5 is connected in parallel to the resistor R17. The diode D6 lessens the temperature drift of the conversion gain when the transistor Q10 described later executes voltage-current conversion.

Small level of the signal VKMAX is cut by the transistor Q9 for transmission. At the time, the base voltage of the transistor Q9 is changed based on the level of the CONT1 signal, whereby the cut level is also changed. Consequently, a minus offset is added to VKMAX by the offset addition circuit 11, the minus side is clipped at zero potential, and VKMAX is output to the addition circuit 13 as a VKOFS signal.

In FIG. 3, the anode currents of the three CRTs are output from the secondary terminal of the flyback transformer 4 and total anode current IA is input from the primary terminal of the flyback transformer 4. The current IA has a high-frequency component shunted to ground by the capacitor C6 and a low-frequency component input through the resistor R23 to the current detection resistor R1. Since the resistor R1 is connected at one end to the DC voltage supply VCC1, the low-frequency component containing DC, of the current IA is detected as a voltage drop across the resistor R1 and the detected voltage is input to the addition circuit 13 and the low-pass filter (1) 17 as VDET1.

The addition circuit 13, to which VDET1 is input, inputs VDET1 through the oscillation prevention resistor R22 to the base of the voltage buffer transistor Q11 and the transistor Q11 voltage-drives the emitter in response to VDET1. On the other hand, the addition circuit 13 converts the input voltage signal VKOFS into collector current IADD of the transistor Q10 by the transistor Q10 and causes a voltage drop from the emitter voltage of the transistor Q11 to occur across the load resistor 20 by the load resistor 20. Consequently, the addition circuit 13 adds VDET1 and VKOFS and outputs the result to the comparison circuit 6 as VSUM1.

FIG. 4 shows the signal levels in the circuit parts until the cathode current and anode current of each CRT are detected and output to the comparison circuit 6 as VSUM. In the figure, IKGt represents the instantaneous level of the cathode current IKG of the green CRT 3G, VKMAXt represents the instantaneous level of the maximum value detection voltage VKMAX, VKOFSt represents the instantaneous level of the offset addition output VKOFS, and VDET1t represents the instantaneous level of the anode current detection value VDET1. VSUMt indicated by the dashed line represents the instantaneous level of the voltage VSUM provided by performing inversion addition of VKOFS to VDET1. In FIG. 4, for description, VSUMt is represented as a lower level than VDET1, however, as described later, the gain of the beam current is controlled by a closed loop and thus the apparent amplitude change of VSUMt of an error signal is small.

In FIG. 4, the cathode current IKGt of the green CRT 3G flows into the current detection resistor R5 and is converted into a voltage. At the time, minute asperities are smoothed by the smoothing capacitor C2 and the voltage is passed through the diode D4 and becomes a potential difference across the resistor R9. The cathode current IKGt of the green CRT 3G also flows into the resistor R4 and is converted into a voltage and the voltage at one end of the resistor R9 is determined. The potential difference across the resistor R9 is added to the voltage and the resultant voltage is VKMAX. When the voltage detected at the resistor R4 is equal to or less than the Zener voltage of the Zener diode D1, the potential difference across the resistor R5 is small and the VKMAXt signal becomes a voltage close to the voltage detected at the resistor R4.

The current detection gain is large and an average current detection error would occur. However, offset OFS is added to VKMAXt, whereby when VKOFSt is obtained, a negative value is set to a zero value, so that no effect is produced. The VKOFSt signal is input to the addition circuit 13, which then adds the VKOFSt signal to the VDET1t signal and outputs a VSUMt signal as the addition result. The VSUMt signal is input to the low-pass filter (2) 18 through which horizontal period fluctuation is smoothed, then the resultant signal is input to the comparison circuit 6.

The gain of the CRT beam current is controlled by two closed loops. The first loop concerns the AKB operation and is a loop made up of the signal processing circuit 101, the amplification circuit 102, the current detection circuit 107, the AKB detection pulse generation circuit 10, and the signal processing circuit 101 to which the loop is returned as the AKBDET signal is provided. The operation of the AKB detection loop is described in known technical documents, such as U.S. Pat. No. 4,633,321.

The second loop is a main loop made up of the signal processing circuit 101, the amplification circuit 102, CRT cathode current, CRT anode current, the flyback transformer 4, total anode current IA, the current detection circuit 5, the addition circuit 13, the low-pass filter (2) 18, the comparison circuit 6, and the signal processing circuit 101 to which the loop is returned as the CONT6 signal is provided. The second loop has a subloop, which is shunted from the CRT cathode current to the current detection circuit 107 to the maximum value selection circuit 108 to the offset addition circuit 11 to the coefficient addition circuit 12 to the addition circuit 13.

The CRT average beam current is controlled based on the total characteristic of the main loop and the subloop. Only the main loop operates for the normal beam current. If the beam current of any CRT grows, the subloop is brought into conduction, whereby the total feedback gain grows and the beam current is limited all the more strongly. The VKMAX signal is input to the offset addition circuit 11 and minus offset is added, whereby only signals larger than it are transmitted, so that the range in which the subloop is brought into conduction is limited. At the time, the offset level is controlled by the CONT1 signal. The CONT1 signal is output from the microcomputer 16 to the offset addition circuit 11 and thus the microcomputer 16 can change the current limit range of the beam current of each CRT.

If the current limit range is changed, it is also necessary to stably control the CRT beam current. First, the gain and the phase in the main loop are set, for example, based on the characteristic of the low-pass filter (2) 18 and the constant values of the anode current detection resistor R1 and the capacitor C6 forming a part of the current detection circuit 5 so that the control characteristic of the main loop becomes stable. Next, the gain of the subloop and the frequency characteristic of the phase are set, for example, based on the values of the capacitor C5 and the resistor R17 of the components of the coefficient addition circuit 12 so that the combined control characteristic of the subloop and the main loop becomes stable.

If change in the anode current value with time is small over the time of several ten video frames or more, the CRT beam current is limited so that it is lessened all the more. The operation of determining whether or not the change in the anode current with time is small will be discussed with reference to FIG. 5. The instantaneous waveform of the detection signal VDET1 output by the current detection circuit 5 is indicated by VDET1t in FIG. 5 and has asperities of video scanning line period. In the figure, assume that the anode current is stable as a large value to time t1 and changes so as to lessen from time t1 to time t2 and is constant at a small level after time t2. VDET1t is input to the low-pass filter (1) 17 through which the asperities of the scanning line period are removed and a V1LPFt signal in FIG. 5 is output. The V1LPFt signal is input to the averaging circuit 14, which then averages V1LPFt in the time range corresponding to several ten video frames and outputs the average as a V1AVEt signal in FIG. 5 to the error detection circuit 15. The error detection circuit 15 inputs the V1LPFt signal as well as the V1AVEt signal and determines whether the difference between both the signals is small or large. If the difference is large, the error detection circuit 15 outputs a V1MOVt signal high; if the difference is small, the error detection circuit 15 outputs a V1MOVt signal low, as shown in FIG. 5.

If the input V1MOVt signal is low, the microcomputer 16 determines that a change in the anode current IA with respect to time is small. On the other hand, if the V1MOVt signal is high, the microcomputer 16 determines that the change in the anode current IA with respect to time is large. When the change in the anode current IA with respect to time change is small, the offset level OFS added by the offset addition circuit 11 is lessened by the CONT1 signal and the change range of the cathode current is further limited to a smaller range. In FIG. 5, V1MOVt is high from time t1 to t3 and thus it is determined that a change in the image with respect to time is large, and the offset level OFS is increased. Since V1MOVt is low after time t3, it is determined that the subsequent change in the image with respect to time is small, and the offset level OFS is lessened. If a period of time during which the anode current change is small continues over additional several hundred frames or more, the microcomputer 16 furthermore lessens the offset level OFS, thereby limiting the CRT beam current to a smaller value range.

The microcomputer 16 outputs CONT3 to the signal processing circuit 101, which then selects an input signal. To select the computer signal SIG2 or the menu signal SIG3 as the input signal, the CONT1 signal and (or) the CONT2 signal are output, thereby limiting the CRT beam current to a small range as compared with the case where SIG1 is input.

FIG. 6 is a three-axis graph to show the range in which the cathode currents of the three CRTs are limited in the embodiment. A triangle TRI2 surrounded by a point P4 on an IKB axis and a line L1 is the range in which the beam current of the blue CRT is limited. Likewise, an IKR axis is limited with current value indicated by a triangle TRI3 and an IKG axis is limited with current value indicated by a triangle TRI4. When a normal television signal is input, the range surrounded by the triangle TRI1, TRI2, TRI3 and TRI4 is the cathode current limit range in the embodiment.

If a normal image signal changes to, for example, a blue plane signal, initially the IKB axis is limited to the current value indicated by the point P4 in the figure. If the blue plane signal is input continuously over the period of several ten frames or more, as described above, the current is limited to a narrower range and IKB is limited to the current indicated by a point P3. Further, if current change does not occur over several hundred frames or more, the current is limited to a level close to an origin O rather than the current indicated by the point P3. The current limit range indicated by the triangle TRI1 is related to the rated current of the power supply circuit or the total amount of X rays emitted by CRT and thus a current exceeding it cannot be allowed to flow. The current limit range indicated by the point P3 is the limit value corresponding to the rated value of the average beam current of CRT. If a constant current flows continuously for a long time, the current limit range is changed to a narrow range, as described above. For most television image signals with current values changing with time, the wide current limit range represented by the triangles TRI2, TRI3, and TRI4 is set for displaying images brightly.

(Second Embodiment)

FIG. 7 is a block diagram to show a beam current limiting circuit for a video projector according to a second embodiment of the invention. In the figure, numeral 19 denotes a maximum value selection circuit, numeral 20 denotes an analog-digital conversion circuit, and numeral 21 denotes a microcomputer. Components identical with those previously described with reference to FIG. 1 are denoted by the same reference numerals in FIG. 7 and will not be discussed again.

The maximum value selection circuit 19 inputs the detection values of cathode currents, selects the minimum value among them, and outputs the minimum value to the analog-digital conversion circuit 20 as VKMIN. The analog-digital conversion circuit 20 inputs VDET1, VKMAX, and VKMIN, converts the three signals into digital signals, and outputs the digital signals to the microcomputer 21. To convert the three inputs into the digital signals, for example, the three signals maybe switched and input to one analog-digital conversion circuit in sequence or may be input to three analog-digital conversion circuits and provided digital signals may be output; any known method can be used. The digital signals into which VDET1, VKMAX, and VKMIN are converted are input to the microcomputer 21, which then performs calculation processing based on the digital signals and outputs control output VCPU based on the calculation result to an addition circuit 13.

Also, in the second embodiment, the gain of the CRT beam current is controlled by two closed loops. The first loop concerns the AKB operation. The second loop is a main loop made up of a signal processing circuit 101, an amplification circuit 102, CRT cathode current, CRT anode current, a flyback transformer 4, total anode current IA, a current detection circuit 5, the addition circuit 13, a comparison circuit 6, and the signal processing circuit 101 to which the loop is returned as a CONT6 signal is provided.

The second loop has a subloop, which is shunted from the CRT cathode current to a current detection circuit 107 to a maximum value selection circuit 108 to the analog-digital conversion circuit 20 to the microcomputer 21 to the addition circuit 13. The first loop and the main loop of the second loop perform the closed loop control operation as analog circuit. The subloop of the second loop performs digital control by discrete sampling, but does not affect the operation characteristic of the main loop as it responds sufficiently slowly as compared with the main loop.

The microcomputer 21 adds minus offset OFS1 to the input digital signal of the VKMAX signal and then multiplies by a coefficient A to provide CONT4 and outputs a VCPU signal based on CONT4 to the addition circuit 13. The output circuit form of the VCPU signal is not limited. To execute in binary signal, a logical output terminal may be used; to execute in multilevel signal, digital-analog conversion circuit may be added for output as analog signal. The VCPU signal matches the VKOFS signal in the first embodiment in polarity and level. Upon reception of the digital signal into which the VDET1 signal is converted, the microcomputer 21 determines whether or not change exists. If the change is small, the microcomputer 21 lessens the value of OFS1 and performs calculation processing of the VKMAX signal. To determine whether or not the change exists, various calculation processing methods are available; any method may be used if it can provide the determination result similar to that with the V1MOV signal in the first embodiment. In addition to the described operation of the current limiting operation in the second embodiment as in the first embodiment, the following operation is performed in the second embodiment:

The microcomputer 21 calculates difference DIFF between the maximum value and the minimum value from the input digital signals of the VKMAX and VKMIN signals, adds offset OFS2, multiplies by a coefficient B to provide CONT5, adds CONT5 to CONT4, and the result (CONT4+CONT5) to the addition circuit 13 as VCPU. The initial value of the offset OFS2 is a level corresponding to the average rated current value of each CRT and if it is determined that image signal change does not occur over a long time of several hundred video frames or more, the offset is lessened to about a half the initial value.

The range in which the beam current is limited will be discussed with reference to FIG. 8. In the figure, the inside of the cube indicated by the solid lines is the current range applied when the highest limit is placed. For example, when a blue plane signal is input, IKB is limited to the current level indicated by point P3 when the time of several ten frames or more has elapsed. It is limited to the current level indicated by point P5 when the additional time of several hundred frames or more has elapsed. If IKB, IKR, and IKG are at similar level, each is limited to the current level in the vicinity of point P1 as in the first related art example, and a display image does not become dark. For a menu signal or a computer signal much containing a plane deep in a specific color, the beam current of the CRT corresponding to the color is limited to a value similar to that of IKB applied when a blue plane signal is input.

FIG. 9 shows the current limit range on a plane containing the IKB axis and the IKG axis in FIG. 8. If a blue plane signal is input continuously, initially the current IKB becomes the value indicated by point P4, next becomes the value indicated by point P3 and then the value indicated by point P5. This limiting sequence proceeds if current change does not occur. If current change is detected, a return is made to the limit value indicated by the point P4. If current change is always detected, the limit value indicated by the point P4 remains unchanged. Change in the current control characteristic from the point P4 to the point P3 can be given by the value of OFS1; likewise, change in the current control characteristic from the point P3 to the point P5 is given by the value of OFS2.

FIG. 9 also shows various combinations of IKB and IKG. The polygonal line containing the point P4 indicates the limit range applied when current change is detected, and the polygonal line containing the point P5 indicates the limit range applied when current change does not occur for a long time. The polygonal line containing the point P2 indicates the limit range of the current limiting circuit in the related art and the polygonal line containing the point P3 indicates the current limit range of the improved current limiting circuit in another related art; the coordinates are not moved depending on whether or not current change occurs.

FIG. 10 is a flowchart to show a routine of the microcomputer 21 for performing calculation processing concerning the beam current. In the figure, F1 indicates route start, F2 indicates initialization of variables, F3 indicates initialization of a counter, F4 indicates the first closed loop control operation of external circuit, F5 indicates data read from the outside, F6 indicates VKMAX peak level determination, F7 indicates CONT1 calculation processing, F8 indicates CONT2 calculation processing, F9 indicates VCPU calculation processing, F10 indicates the second closed loop control operation of external circuit, F11 indicates read of external data, F12 indicates determination processing of no transient response period of external circuit, F13 indicates current change detection, F14 indicates continuation time counting of no change, F15 indicates continuation time determination 1, F16 indicates OFS1 limit determination, F17 indicates continuation time determination 2, F18 indicates OFS2 limit determination, F19 indicates control of external signal processing circuit 101, F20 indicates OFS1 subtraction processing, and F21 indicates OFS2 subtraction processing.

The microcomputer 21 starts the operation (F1) and initializes the variables OFS1 and OFS2 to OFS1INT and OS2INT (F2). Next, the microcomputer 21 initializes a counter N to zero (F3). An AKB circuit of the external circuit operates and cutoff current is automatically adjusted (F4). Next, data of the VKMAX and VKMIN signals is input (F5) and whether or not the maximum value of VKMAX exceeds the limit is determined (F6). If VKMAX does not exceed the limit, CONT1 is calculated (F7), next CONT2 is calculated (F8). Then, CONT1 and CONT2 are added together and the result is output as VCPU.

At F6, if VKMAX exceeds the limit PKLIMIT, the CONT2 signal is output to the signal processing circuit 101 for lessening the contrast, etc., thereby lessening the signal peak value, and control goes to F3. Following F9, a current limiting circuit of the external circuit operates and closed loop control is performed with VCPU as subloop feedback (F10). VDET1 is input (F11) and whether or not the counter N exceeds NMASK is determined (F12). If the counter N exceeds NMASK, whether or not time change of the anode current IA occurs is determined based on the input data of VDET1 (F13). Although the time change determination method is not specified, whether or not time change occurs for the time of several ten video frames is determined.

If the counter N does not exceed NMASK at F12, control goes to F4. If it is determined at F13 that no change occurs, the counter N is incremented by one (F14) and whether or not N is equal to or greater than upper limit NLIMIT is determined (F15). If N is equal to or greater than the upper limit NLIMIT, whether or not OFS1 is equal to or less than minimum value OSF1MIN is determined (F16) If OFS1 is greater than the minimum value OSF1MIN, OFS1 is decremented by STEP1 (F20) and control goes to F3. If OFS1 is equal to or less than the minimum value OSF1MIN at F16, whether or not N exceeds NLIMIT2 is determined (F17). If N exceeds NLIMIT2, whether or not OFS2 is equal to or less than OFS2MIN is determined (F18). If OFS2 is greater than OFS2MIN, OFS2 is decremented by STEP2 (F21) and control goes to F3. If No is returned at F13, no processing is performed and control goes to F2. If No is returned at F15 or F17, control goes to F4. If Yes is returned at F18, control also goes to F4. In the described routine, the operation of the external circuit is executed in real time independently of the number of calculation processing times of the computer.

The number of times of each determination process can be set in various manners. For example, to make one determination for the time of one video frame, NMASK is set to 10, NLIMIT1 is set to 60, and NLIMIT2 is set to 600. When VCPU changes, it is necessary to skip determining whether or not time change of current occurs until the external circuit responds and the CRT beam current becomes stable. The time is set in NMASK. In the example, NMASK is set to 10; a numeric value fitted to the characteristic of the external circuit may be set.

Whether or not the peak value of VKMAX exceeds the limit value is determined at F6. Since the input VKMAX signal itself is diode-detected by the maximum value selection circuit 108 and is output as voltage close to the peak to some extent, the number of read times of VKMAX at F5 is several or more for one scanning line period and the maximum value of VKMAX is held for the frame period, so that the number of determination times at F6 can be set to one for the frame period.

Since the subloop of calculation processing for performing the control operation if time change is small is thus added to the main loop of external closed loop current control responding in real time, drastic change of the current limit range can be accomplished stably. Since the calculation frequency of the microcomputer 21 is low, a high-speed microcomputer need not be used.

In FIG. 7, the maximum value selection circuit 108, the minimum value selection circuit 19, and the analog-digital conversion circuit 20 are separate components, but may be integrated into one integrated circuit together with the microcomputer 21. In this case, the detection voltage of the cathode current of each CRT maybe connected to an analog-digital conversion function terminal of the integrated circuit and the maximum value and the minimum value may be selected by data processing of the microcomputer. The processing procedure, the number of processing times, the execution intervals, the limit values of the variables, and the like can be modified in various manners in response to the characteristics of the execution apparatus.

As described above, according to the invention, both the cutoff current of CRT cathode current and the average current can be detected according to a simple circuit configuration, so that it is made possible to perform closed loop control of current in a wide range from a small current to a large current, and a highly reliable circuit less changing over time for providing stable display image quality can be provided at low costs.

If an image with small current change is displayed for a long time, the CRT beam current is limited to equal to or less than the rated current reliably and if the current difference among the CRTs is large, the current is limited smaller than the rated average current of CRT, so that a video projector can be provided wherein a screen phosphor burn-in does not occur even if a television image is displayed brightly.

What is claimed is:

1. A beam current limiting circuit for a video projector comprising:

a cathode current detector for detecting a cathode current of each of a plurality of CRTs used with a video projector;

wherein said cathode current detector is used to adjust a current in a black image (cutoff current) on the CRT and limit a beam current flowing into the CRT; and wherein said cathode current detector comprises a first resistor being inserted to a cathode current passage of each CRT for detecting a black screen current (cutoff current) and a second resistor inserted to the cathode current passage of each CRT for detecting the beam current flowing into the CRT, the first and second resistor being connected in series.

2. A beam current limiting circuit for a video projector comprising:

a cathode current detector for detecting a cathode current of each of a plurality of CRTs used with a video projector;

wherein said cathode current detector is used to adjust a current in a black image (cutoff current) on the CRT and limit a beam current flowing into the CRT; and an anode current change detector for detecting a change in anode current with a time, wherein when said anode current change detector determines that a change in current is small over a predetermined period of time, said cathode current detector limits the cathode current more.

3. The beam current limiting circuit as claimed in claim 2 wherein said anode current change detector includes an analog/digital converter that inputs an anode current detection signal, and a microcomputer connected to said analog/digital converter.

4. A beam current limiting circuit for a video projector comprising:
   a circuit loop for controlling the gain and phase for a beam current being input for each of a plurality of CRTs used with a video projector; and
   wherein said circuit loop including a circuit subloop that is activated to limit the beam current being input in response to a current limit threshold being satisfied.

5. The circuit of claim 4, wherein said circuit loop and said circuit subloop both including a current detector to detect when said current limit threshold is satisfied and activate said circuit subloop to adjust the range of the beam current being input.

* * * * *